United States Patent
Sapiro et al.

(10) Patent No.: US 9,998,666 B2
(45) Date of Patent: Jun. 12, 2018

(54) SYSTEMS AND METHODS FOR BURST IMAGE DEBLURRING

(71) Applicant: Duke University, Durham, NC (US)

(72) Inventors: Guillermo Sapiro, Durham, NC (US); Mauricio Delbracio, Montevideo (UY)

(73) Assignee: Duke University, Durham, NC (US)

( * ) Notice: Subject to any disclaimer, the term of this patent is extended or adjusted under 35 U.S.C. 154(b) by 0 days. days.

(21) Appl. No.: 15/248,895

(22) Filed: Aug. 26, 2016

(65) Prior Publication Data
US 2017/0064204 A1 Mar. 2, 2017

Related U.S. Application Data

(60) Provisional application No. 62/210,028, filed on Aug. 26, 2015.

(51) Int. Cl.
*H04N 5/228* (2006.01)
*H04N 5/202* (2006.01)
(Continued)

(52) U.S. Cl.
CPC ......... *H04N 5/23267* (2013.01); *G06T 5/003* (2013.01); *G06T 5/20* (2013.01);
(Continued)

(58) Field of Classification Search
CPC . G06T 2207/10024; G06T 2207/20056; G06T 2207/20201; G06T 5/20; G06T 7/0036; G06T 7/206; H04N 5/23245; H04N 5/23254; H04N 5/23258; H04N 5/23267; H04N 5/23277; H04N 5/23264
See application file for complete search history.

(56) References Cited

U.S. PATENT DOCUMENTS

| 2009/0232373 A1* | 9/2009 | Licato | ............ G06T 5/10 382/131 |
| 2010/0128841 A1* | 5/2010 | Imas | ............ G06T 5/002 378/16 |

(Continued)

OTHER PUBLICATIONS

Boracchi et al., "Modeling the performance of image restoration from motion blur," IEEE Trans. Image Process., 2012, vol. 21, No. 8, pp. 3502-3517.

(Continued)

*Primary Examiner* — Chia-Wei A Chen
(74) *Attorney, Agent, or Firm* — Michael Best & Friedrich LLP

(57) ABSTRACT

System and Method for automatically removing blur and noise in a plurality of digital images. The system comprises an electronic processor configured to receive the plurality of digital images, perform motion estimation and motion compensation to align the plurality of digital images, determine an alignment of the plurality of digital images with respect to a reference frame, generate a consistency map based on the alignment of the plurality of digital images with respect to the reference frame, combine the plurality of digital images aligned with respect to the reference frame in the Fourier domain using a quality of alignment information from the consistency map to generate an aggregated frame, and apply a post-processing filter to enhance the quality of the aggregated frame.

19 Claims, 30 Drawing Sheets

(51) Int. Cl.
  *H04N 5/232* (2006.01)
  *G06T 5/20* (2006.01)
  *G06T 5/00* (2006.01)
  *G06T 5/50* (2006.01)

(52) U.S. Cl.
  CPC ............ *G06T 5/50* (2013.01); *H04N 5/23245* (2013.01); *H04N 5/23254* (2013.01); *H04N 5/23258* (2013.01); *G06T 2207/10016* (2013.01); *G06T 2207/10024* (2013.01); *G06T 2207/20056* (2013.01); *G06T 2207/20182* (2013.01); *G06T 2207/20201* (2013.01); *G06T 2207/20221* (2013.01)

(56) References Cited

U.S. PATENT DOCUMENTS

| | | | |
|---|---|---|---|
| 2011/0311115 A1* | 12/2011 | Li | G06T 7/37 382/128 |
| 2012/0189195 A1* | 7/2012 | Paik | H04N 5/23212 382/164 |
| 2015/0262341 A1* | 9/2015 | Nash | H04N 5/23229 348/208.6 |
| 2016/0217577 A1* | 7/2016 | Tom | G06T 7/0026 |
| 2016/0241884 A1* | 8/2016 | Messing | H04N 19/85 |
| 2016/0330374 A1* | 11/2016 | Ilic | H04N 5/23251 |
| 2017/0054909 A1* | 2/2017 | Iancu | H04N 5/23267 |
| 2017/0091550 A1* | 3/2017 | Feng | G06K 9/00617 |
| 2017/0094164 A1* | 3/2017 | Shabtay | H04N 5/23232 |
| 2017/0206671 A1* | 7/2017 | Pollard | G06T 7/37 |
| 2017/0236407 A1* | 8/2017 | Rhoads | G08C 17/02 455/420 |

OTHER PUBLICATIONS

Buades et al., "A note on multi-image denoising," In LNLA, 2009. 15 pages.
Cai et al., "Blind motion deblurring using multiple images," J. Comput. Phys., 2009, 228(14):5057-5071.
Carignan et al., "Quantifying the importance of high frequency components on the amplitude of physiological tremor," Exp. Brain Res., 2010, vol. 202, No. 2, pp. 299-306.
Chen et al., "Robust dual motion deblurring," In CVPR, 2008, 8 pages.
Cho et al., "Fast motion deblurring," ACM Trans. Graph., 2009, 28(5):145:1-145:8.
Cho et al., "Video deblurring for hand-held cameras using patch-based synthesis," ACM Trans. Graph, 2012, vol. 31, No. 4, pp. 64:1-64:9.
Colom et al., "Analysis and Extension of the Ponomarenko et al. Method, Estimating a Noise Curve from a Single Image," J. Image Proc. On Line (IPOL), 2013, vol. 3, pp. 173-197.
Delbracio et al. "Hand-held Video Deblurring via Efficient Fourier Aggregation," IEEE, 2015, 1-13.
Delbracio et al. "Removing Camera Shake via Weighted Fourier Burst Accumulation," IEEE, 2015, 1-15.
Delbracio et al., "The Non-parametric Sub-pixel Local Point Spread Function Estimation Is a Well Posed Problem," Int. J. Comput. Vision, 2012, vol. 96, pp. 175-194.
Fergus et al., "Removing camera shake from a single photograph," ACM Trans. Graph., 2006, vol. 25, No. 3, pp. 787-794.
"Fischler et al., ""Random sample consensus: a paradigm for model fitting with applications to image analysis and automated cartography,""" Comm. ACM, 1981, 24(6):381-395.".
Garrel et al., "A highly efficient lucky imaging algorithm: Image synthesis based on Fourier amplitude selection," Publ. Astron. Soc. Pac., 2012, vol. 124, No. 918, pp. 861-867.
Gavant et al., "A physiological camera shake model for image stabilization systems," IEEE Sensors, 2011, 4 pages.
Haro et al., "Photographing paintings by image fusion," SIAMJ. Imag. Sci., 2012, vol. 5, No. 3, pp. 1055-1087.
"Ito et al., ""Blurburst: Removing blur due to camera shake using multiple images,"" ACM Trans. of Graph., 2013, 15 pages.".
Joshi et al., "Seeing Mt. Rainier: Lucky imaging for multi-image denoising, sharpening, and haze removal," In Proc. IEEE Int. Conf. Comput, Photogr. (ICCP) 2010, 8 pages.
Kim et al., "Generalized video deblurring for dynamic scenes," Proc. IEEE Conf. Comput. Vis. Pattern Recognit. (CVPR) 2015, 9 pages.
Krishnan et al., "Blind deconvolution using a normalized sparsity measure," in Proc. IEEE Conf. Comput. Vis. Pattern Recognit. (CVPR) 2011, 8 pages.
Kundur et al., "Blind Image deconvolution," IEEE Signal Process. Mag., 1996, vol. 13, pp. 43-64.
Lebrun et al., "Implementation or the "Non-Local Bayes" (NL-Bayes) Image Denoising Algorithm," Image Processing On Line, 2013, 3:1-42.
Levin et al., "Efficient marginal likelihood optimization in blind deconvolution," In CVPR, 2011, 8 pages.
Levin et al., "Understanding and evaluating blind decon-volution algorithms," In CVPR, 2009, 9 pages.
Lowe, "Object recognition from local scale-invariant features," In /CCV, 1999, 8 pages.
Lowe, "Distinctive image features from scale-invariant keypoints," Int. J. Comput. Vision, 2004, vol. 60, pp. 91-110.
Moisan et al., "Automatic homographic registration of a pair of images, with a contrario elimination of outliers," J. Image Proc. On Line (IPOL), 2012, vol. 2, pp. 56-73.
Park et al., "Gyro-based multi-image deconvolution for removing handshake blur," In Proc. IEEE Conf. Comput. Vis. Pattern Recognit. (CVPR) 2014, 8 pages.
Rav-Acha et al., "Two motion-blurred images are better than one," Pattern Recogn. Lett., 2005, 26(3)311-317.
Sanchez et al., "TV-L1 Optical Flow Estimation," J. Image Proc. On Line (IPOL), 2013, vol. 3, pp. 137-150.
Sroubek et al., "Robust multichannel blind deconvolution via fast alternating minimization," IEEE Trans. Image Process., 2012, vol. 21, No. 4, pp. 1687-1700.
Whyte et al., "Non-uniform deblurring for shaken images," Int. J. Comput. Vision, 2012, 98(2):168-186.
Xiao et al., "Camera-motion and effective spatial resolution," In ICJS, 2006, 4 pages.
Yuan et al., "Blurred/non-blurred image alignment using sparseness prior," in Proc. IEEE Int. Conf. Comput. Vis. (ICCV) 2007, 8 pages.
Zach et al., "A duality based approach for realtime TV-L1 optimal flow," in Proc. of the 29th DAGM Conf. on Pattern Recognit, 2007, pp. 214-223.
Zhang et al., "Gradient-directed Attorney composition of multi-exposure images," in In Proc. IEEE Conf. Comput. Vis. Pattern Recognit. (CVPR) 2010, 7 pages.
Zhang et al., "Multi-image blind deblurring using a coupled adaptive sparse prior," In Proc. IEEE Conf. Comput. Vis.Pattern Recognit. (CVPR) 2013, 8 pages.
Zhu et al., "Deconvolving PSFs for a better motion deblurring using multiple images," In ECCV, 2012, 12 pages.
Zitova et al., "Image registration methods: a survey," Image vision Comput., 2003, vol. 21, No. 11, pp. 977-1000.

* cited by examiner

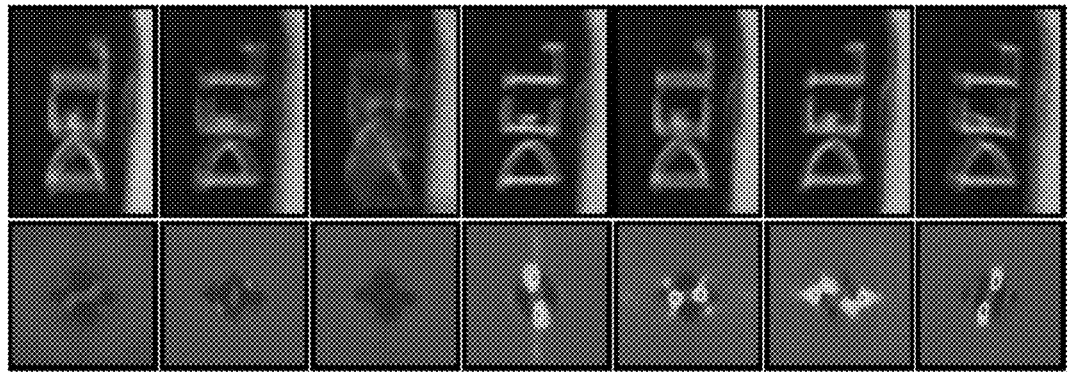
(a) Frames crop 1-7 and the Fourier weights $w_i$ for $p = 11$.
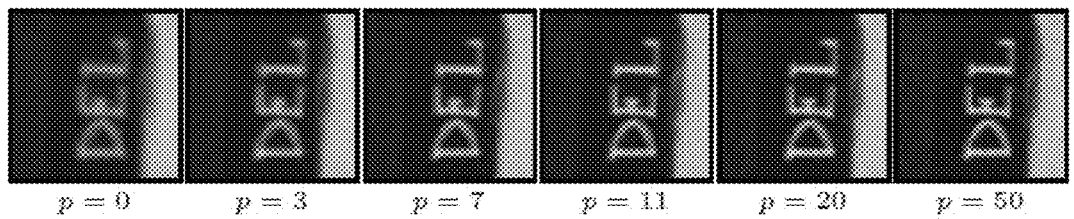
$p = 0 \quad p = 3 \quad p = 7 \quad p = 11 \quad p = 20 \quad p = 50$
(b) Fourier Aggregation results for different $p$ values.
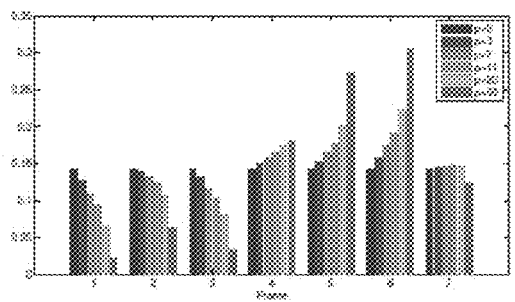 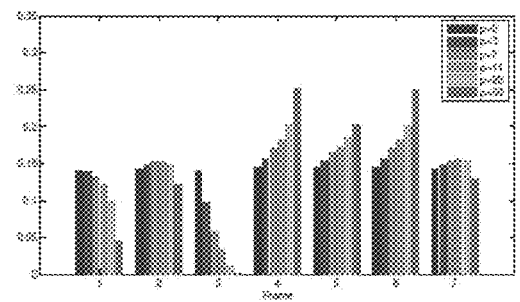
(c) Weights energy distribution:
$we_i = \int |w_i(\zeta)|^2 d\zeta$
(d) Weighted frames energy distribution:
$wfe_i = \int |w_i(\zeta) \cdot \hat{v}_i(\zeta)|^2 d\zeta$
FIG. 4

Algorithm 1: Aggregation of Blurred Images

Input: A series of images $\tilde{v}_1, \tilde{v}_2, \ldots, \tilde{v}_n$ of size $m \times n \times c^*$. An integer value $p$.

Output: The aggregated image $u_p$

1   $w = \text{zeros}(m,n)$; $\hat{u}_p = \text{zeros}(m,n,c)$;

2 for *image $i$ in $\{1, \ldots, n\}$* do

*Burst Registration*

3      $M_i = \text{SIFT}(\tilde{v}_i, \tilde{v}_1)$ ;      $M_i$ *set of corresponding points.*

4      $H_i = \text{ORSA}(M_i)$ ;      $H_i$ *dominant homography in $M_i$.*

5      $v_i = \tilde{v}_i \circ H_i$ ;      *Image resampling.*

*Fourier Burst Accumulation*

6      $\hat{v}_i = \text{FFT}(v_i)$;

7      $w_i = \frac{1}{c} \sum_{j=1}^{c} |\hat{v}_i^j|$;      *Mean over color channels*

8      $w_i = G_\sigma w_i$ ;      *Gaussian smoothing*

9      $\hat{u}_p = \hat{u}_p + w_i \cdot \hat{v}_i$;      *Weighted Fourier accumulation*

10      $w = w + w_i$;

11   $u_p = \text{IFFT}(\hat{u}_p / w)$;

*Noise Aware Sharpening (Optional)*

12   $\bar{u}_p = \text{DENOISE}(u_p)$;

13   $\bar{u}_p^s = 2\bar{u}_p - G_\rho \bar{u}_p$;      *Gaussian sharpening, $\rho \in [1,3]$*

14   $u_p = \bar{u}_p^s + \delta(u_p - \bar{u}_p)$; *Add a fraction of removed noise, $\delta = 0.4$*

[*] *$c$ is the number of color channels, typically 3. The color channels of $v$ are denoted by $v^j$, for $j = 1, \ldots, c$. All the regular operations (e.g. $+, /, \cdot$) are point-wise.*

FIG. 10

Algorithm 1: Consistent Aggregation of a Sequence

Input : A sequence of $2M+1$ RGB images $v_{-M}, \ldots, v_0, \ldots, v_M$ of size $m_h \times m_w \times n_c$, block size $b$, block overlap $s$, FBA parameter $p$.
Output : Filtered (reference) image $\bar{u}$.

*Consistent Registration*

1 for $i = -M : M$ do
2 $\quad\quad \tau_i^0 = \text{OPTICALFLOW}(v_i, v_0);$ *Forward flow estimation*
3 $\quad\quad \tau_0^i = \text{OPTICALFLOW}(v_0, v_i);$ *Backward flow estimation*
4 $\quad\quad \text{cMap}(x) = |(\tau_i^0 \circ \tau_0^i)(x) - x|;$ *Consistent Pixels Map*
5 $\quad\quad M(x) = \text{cMap}(x) \leq \epsilon;$ *Consistent Pixels Mask*
6 $\quad\quad M(x) = G_\rho(\text{DILATE}(M(x), r));$ *Dilate and Smooth*
7 $\quad\quad v_i^0(x) = M(x) \cdot (v_i \circ \tau_i^0)(x) + (1 - M(x)) \cdot v_0(x);$

*Local Fourier Burst Accumulation*

8 $u = \text{zeros}(m_h, m_w, n_c);\ c = \text{zeros}(m_h, m_w);$ *Aux. Buffers Initialization*
9 for $j = 1 : s : m_h$ and $k = 1 : s : m_w$ do
10 $\quad\quad \hat{Q} = \text{zeros}(b, b, n_c);\ w = \text{zeros}(b, b);$ *Aux. Block Buffer Initialization*
11 $\quad\quad X_{j,k} = $ coordinates of $(b \times b \times n_c)$-patch centered at pixel $(k, l);$
12 $\quad\quad$ for $i = -M : M$ do
13 $\quad\quad\quad\quad P_i = v_i^0(X_{j,k});$
14 $\quad\quad\quad\quad \hat{P}_i = \text{FFT}(P_i);$
15 $\quad\quad\quad\quad w_i = \text{colorAverage}(|\hat{P}_i|);$ *Mean over color channels*
16 $\quad\quad\quad\quad w_i = G_\sigma w_i;$ *Gaussian smoothing*
17 $\quad\quad\quad\quad \hat{Q} = \hat{Q} + w_i \cdot \hat{P}_i;$ *Weighted Block Fourier Accumulation*
18 $\quad\quad\quad\quad w = w + w_i;$
19 $\quad\quad Q = \text{IFFT}(\hat{Q}./w);$ *Estimation of pixel values of block* $X_{k,j}$
20 $\quad\quad u(X_{j,k}) = u(X_{j,k}) + Q;$
21 $\quad\quad c(X_{j,k}) = c(X_{j,k}) + 1;$
22 $u = u./c;$

*Comments:* $u(X_{j,k})$ is the evaluation of $u$ on each pixel in patch $X_{j,k}$. The operator $./$ (lines 19 and 22) represents element-wise division. The notation $j = 1 : s : m$ implies that $j$ takes the integer values from $1$ to $m$ by increments of $s$. $G_\sigma$ represents a Gaussian Smoothing of standard deviation $\sigma$. In the current implementation, $\sigma = 50/b$ and $p = 5$. The dilatation operation (line 6) is done with a circular element of radius $r = 5$. Image warpings are done via bicubic interpolation. The consistent registration tolerance is set to $\epsilon = 1$. Default values: $M = 3$, $b = 128$, $s = 64$, and $p = 11$.

FIG. 20

SYSTEMS AND METHODS FOR BURST IMAGE DEBLURRING

RELATED APPLICATIONS

This application claims priority to U.S. Provisional Application No. 62/210,028, filed Aug. 26, 2015, the entire content of which is incorporated by reference herein.

FEDERAL FUNDING LEGEND

This invention was made with Government Support under Federal Grant No. A001413001 awarded by the AFOSR. The Government has certain rights to this invention.

FIELD

Embodiments relate to systems and methods for burst image deblurring.

BACKGROUND

One of the most challenging experiences in photography is taking images in low-light environments. The basic principle of photography is the accumulation of photons in the sensor during a given exposure time. In general, the more photons reach the surface of the sensor the better quality of the final image, as the photonic noise is reduced. However, this basic principle requires the photographed scene to be static and that there is no relative motion between the camera and the scene. Otherwise, the photons will be accumulated in neighboring pixels, generating a loss of sharpness (blur). This problem is significant when shooting with hand-held cameras, the most popular photography device today, in dim light conditions.

Under reasonable hypothesis, the camera shake may be modeled mathematically as a convolution, $$v = u \star k + n, \quad (1)$$

Where, v is the noisy blurred observation, $\mu$ is the latent sharp image, $\kappa$ is an unknown blurring kernel and $\eta$ is additive white noise. For this model to be accurate, the camera movement has to be essentially a rotation with negligible in-plane rotation in its optical axis. The kernel, $\kappa$, results from several blur sources: light diffraction due to the finite aperture, out-of-focus, light integration in the photosensor, and relative motion between the camera and the scene during the exposure. To get enough photons per pixel in a typical low light scene, the camera needs to capture light for a period of tens to hundreds of milliseconds. In such a situation (and assuming that the scene is static and the user/camera has correctly set the focus), the dominant contribution to the blur kernel is the camera shake—mostly due to hand tremors.

Current cameras including those found in camera phones are designed to take a burst of images. This has been exploited in several approaches for accumulating photons in the different images and then forming an image with less noise (mimicking a longer exposure time a posteriori. However, this principle is disturbed if the images in the burst are blurred. The classical mathematical formulation of this problem as a multi-image deconvolution, seeks to solve an inverse problem where the unknowns are the multiple blurring operators and the underlying sharp image. This procedure is computationally very expensive (prohibiting its on-camera implementation), and very sensitive to a good estimation of the blurring kernels. Furthermore, since the inverse problem is ill-posed it relies on priors either or both for the calculus of the blurs and the latent sharp image.

SUMMARY

The present disclosure provides, in part, methods for aggregating a burst of images and taking what is less blurred of each frame to build an image that is sharper and less noisy than all the images in the burst. In practice, the methods provided herein take as input a series of registered images and computes a weighted average of the Fourier coefficients of the images in the burst. With the availability of accurate gyroscope and accelerometers in, for example, phone cameras, the registration can be obtained "for free", rendering the whole method very efficient for on-board implementation. Importantly, the systems and methods provided herein completely avoids explicit computation of the blurring kernel as commonly performed in other implementations.

The systems and methods provided herein, as evidenced through synthetic and real experiments, provide a final image quality that is significantly improved. This is done without explicitly performing deconvolution, which generally introduces artifacts and also a significant overhead. Comparison to state-of-the-art multi-image deconvolution algorithms shows that the systems and methods described herein produce similar or better results while being orders of magnitude faster and simpler. The systems and methods herein do not assume any prior on the latent image but instead relies exclusively on the randomness of hand tremor.

One aspect of the present disclosure provides a method for automatically removing blur and noise in a plurality of digital images. The method includes receiving a plurality of digital images including sequential burst images of an object. The method also includes performing motion estimation and a motion compensation to align the plurality of digital images. The method further includes determining an alignment of the plurality of digital images with respect to a reference frame. The method also includes generating a consistency map based on the alignment of the plurality of digital images with respect to the reference frame. The method also includes combining the plurality of digital images aligned with respect to the reference frame in the Fourier domain using a quality of alignment information from the consistency map to generate an aggregated frame. The method also includes applying a post-processing filter to enhance the quality of the aggregated frame.

Another aspect of the present disclosure provides an image processing system comprising an electronic processor configured to automatically remove blur and noise in a plurality of digital images. The image processing system receives a plurality of digital images including sequential burst images of an object. The image processing system performs motion estimation and a motion compensation to align the plurality of digital images, determines an alignment of the plurality of digital images with respect to a reference frame, generates a consistency map based on the alignment of the plurality of digital images with respect to the reference frame, combines the plurality of digital images aligned with respect to the reference frame in the Fourier domain using a quality of alignment information from the consistency map to generate an aggregated frame; and applies a post-processing filter to enhance the quality of the aggregated frame thereby removing blur and noise in the plurality of digital images.

Other aspects of the present disclosure will become apparent from the subject matter described and illustrated herein.

BRIEF DESCRIPTION OF THE DRAWINGS

The accompanying figures together with the detailed description below, are incorporated in and form part of the specification, and serve to further illustrate embodiments described herein, including various principles and advantages of those embodiments.

FIG. 4 shows several images with various weight distributions of the Fourier Burst Aggregation when changing the value of p, in accordance with some embodiments.

FIG. 10 shows an algorithm for aggregation of blurred images, in accordance with some embodiments.

FIG. 20 shows an algorithm for consistent aggregation of a sequence, in accordance with some embodiments.

DETAILED DESCRIPTION

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the embodiments described herein. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement embodiments of the invention. For example, "mobile device" and "computing device" as used in the specification may include one or more electronic processors, one or more memory modules including non-transitory computer-readable medium, one or more input/output interfaces, and various connections (e.g., a system bus) connecting the components.

Figure 1:
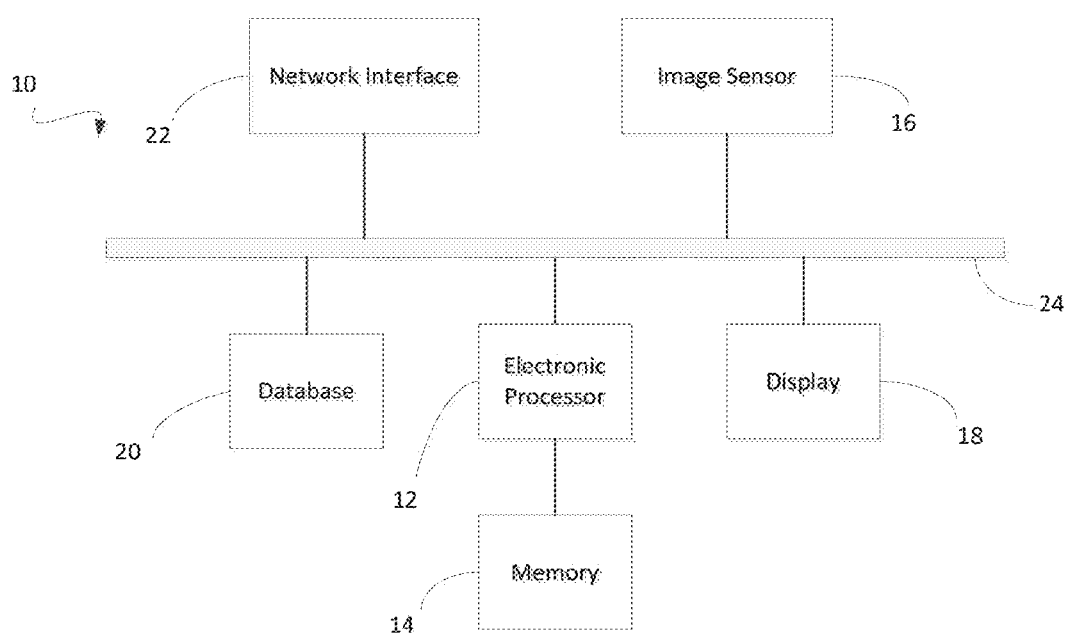
FIG. 1 schematically illustrates an image processing system according to some embodiments.

As noted above, embodiments provide automated systems and methods for aggregating a burst of images and taking what is less blurred of each frame to build an image that is sharper and less noisy than all the images in the burst. For example, FIG. 1 schematically illustrates an image processing system 10 according to some embodiments. The image processing system 10 includes an electronic processor 12 (e.g., a microprocessor, application-specific integrated circuit ("ASIC"), or other suitable electronic device), a memory 14, an image sensor 16 (e.g., a digital still or video camera), a display device 18, a database 20, a network interface 22 that is coupled to an input/output (I/O) interface 24. In some embodiments, the image processing system 10 includes additional, fewer, or different components. For example, in some embodiments, the image processing system 10 includes multiple electronic processors, memories, display devices, or combinations thereof. Also, in some embodiments, the image processing system 10 as described in the present application may perform additional functionality than the image representation functionality described in the present application.

The memory 14 includes non-transitory, computer-readable memory, including, for example, read only memory ("ROM"), random access memory ("RAM"), or combinations thereof. The memory 14 stores program instructions (e.g., one or more software applications) and images. The electronic processor 12 is configured to retrieve instructions from the memory 14 and execute, among other things, the instructions to perform image processing, including the methods described herein. The display device 18 is an output device that presents visual information and may include a light-emitting diode ("LED") display, a liquid crystal display, a touchscreen, and the like.

In some embodiments, the electronic processor 12, the image sensor 16, and the display device 18 are included in a single computing device (e.g., within a common housing), such as a laptop computer, tablet computer, desktop computer, smart telephone, smart television, smart watch or other wearable, or another suitable computing device. In these embodiments, the electronic processor 12 executes a software application (e.g., a "mobile application" or "app") that is locally stored in the memory 14 of the computing device to perform the methods described herein. For example, the electronic processor 12 may execute the software application to access and process data (e.g., images) stored in the memory 14. Alternatively or in addition, the electronic processor 12 may execute the software application to access data (e.g., images) stored external to the computing device (e.g., on a database 20 accessible over a communication network). The electronic processor 12 may output the results of processing the accessed data (i.e., a composite image) to the display device 18 included in the computing device.

In other embodiments, the electronic processor 12, the image sensor 16, the memory 14, or a combination thereof may be included in one or more separate devices. For example, in some embodiments, the image sensor 16 may be included in a smart telephone configured to transmit an image captured by the image sensor 16 to a server including the memory 14 over a wired or wireless communication network or connection. In this configuration, the electronic processor 12 may be included in the server or another device that communicates with the server over a wired or wireless network or connection. For example, in some embodiments, the electronic processor 12 may be included in the server and may execute a software application that is locally stored on the server to access and process data as described herein. In particular, the electronic processor 12 may execute the software application on the server, which a user may access through a software application, such as a browser application or a mobile application) executed by a computing device of the user. Accordingly, functionality provided by the image processing system 10 as described below may be distributed between a computing device of a user and a server remote from the computing device. For example, software a user may execute a software application (e.g., a mobile app) on his or her personal computing device to communicate with another software application executed by an electronic processor included in a remote server.

Regardless of the configuration of the image processing system 10, the image processing system 10 is configured to receive the plurality of digital images, perform motion estimation and motion compensation to align the plurality of digital images, determine an alignment of the plurality of digital images with respect to a reference frame, generate a consistency map based on the alignment of the plurality of digital images with respect to the reference frame, combine the plurality of digital images aligned with respect to the reference frame in the Fourier domain using a quality of alignment information from the consistency map to generate an aggregated frame, and apply a post-processing filter to enhance the quality of the aggregated frame.

Camera shake originated from hand tremor vibrations is essentially random. This implies that the movement of the camera in an individual image of the burst is independent of the movement in another one. Thus, the blur in one frame will be different from the one in another image of the burst.

Removing camera shake blur is one of the most challenging problems in image processing. Although in the last decade several image restoration algorithms have emerged giving outstanding performance, its success is still very dependent on the scene. Most image deblurring algorithms cast the problem as a deconvolution with either a known (non-blind) or an unknown blurring kernel (blind). See for example, a discussion of the most classical methods described by D. Kundur and D. Hatzinakos in 1996 entitled "Blind Image deconvolution," IEEE Signal Process. Mag., vol. 13, pp. 43-64, 1996, incorporated herein by reference. Single Image Blind Deconvolution Most blind deconvolution algorithms try to estimate the latent image without any other input than the noisy blurred image itself. A representative work described by R. Fergus, B. Singh, A. Agarwala in 2006 entitled "Removing camera shake from a single photograph," ACM Trans. Graph., vol. 25, no. 3, pp. 787-794 is incorporated herein by reference. This variational method sparked many competitors seeking to combine natural image priors, assumptions on the blurring operator, and complex optimization frameworks, to simultaneously estimate both the blurring kernel and the sharp image.

Others attempt to first estimate the degradation operator and then applying a non-blind deconvolution algorithm as described by S. Cho and S. Lee in 2009 (entitled "Fast motion deblurring," ACM Trans. Graph., 28(5):145:1-145:8, is incorporated herein by reference) which accelerates the kernel estimation step by using fast image filters for explicitly detecting and restoring strong edges in the latent sharp image. Since the blurring kernel has typically a very small support, the kernel estimation problem is better conditioned than estimating the kernel and the sharp image simultaneously. However, even in non-blind deblurring, i.e., when the blurring kernels are known, the problem is generally ill-posed, because the blur introduces zeros in the frequency domain. Thereby avoiding explicit inversion becomes critical.

Multi-Image Blind Deconvolution

Two or more input images can improve the estimation of both the underlying image and the blurring kernels. In the method described by A. Rav-Acha and S. Peleg in 2005 (entitled "Two motion-blurred images are better than one," Pattern Recogn. Lett., 26(3):311-317, 2005, is incorporated herein by reference) they claimed that "Two motion-blurred images are better than one," if the direction of the blurs are different. In the authors proposed to capture two photographs: one having a short exposure time, noisy but sharp, and one with a long exposure, blurred but with low noise. The two acquisitions are complementary, and the sharp one is used to estimate the motion kernel of the blurred one.

In the paper by O. Whyte, J. Sivic, A. Zisserman, and J. Ponce in 2012 entitled "Non-uniform deblurring for shaken images," Int. J. Comput. Vision, 98(2):168-186 (incorporated herein by reference), the authors introduce a prior on the sparsity of the motion blur kernel to constrain the blind deblurring problem. Most of these multi-image algorithms introduce cross-blur penalty functions between image pairs. However this has the problem of growing combinatorial with the number of images in the burst. This idea is extended in the paper by J. F. Cai, H. Ji, C. Liu and Z. Shen in 2009, (entitled "Blind motion deblurring using multiple images," J. Comput. Phys., 228(14):5057-5071, is incorporated herein by reference) using a Bayesian framework for coupling all the unknown blurring kernels and the latent image in a unique prior. Although this prior has numerous good mathematical properties, its optimization is very slow. The algorithm produces very good results but it may take several minutes or even hours for a typical burst of 8-10 images of several megapixels. The very recent work by S. H. Park and M. Levoy in 2014, (entitled "Gyro-based multi-image deconvolution for removing handshake blur," In Proc. IEEE Conf. Comput. Vis. Pattern Recognit. (CVPR), is incorporated herein by reference) relies on an attached gyroscope, now present in many phones and tablets, to align nil the input images and to get an estimation of the blurring kernels. Then, a multi-image non-blind deconvolution algorithm is applied.

By taking a burst of images, the multi-image deconvolution problem becomes less ill-posed allowing the use of simpler priors. This is explored in paper by A. Ito, A. C. Sankaranarayanan, A Veeraraghavan, and R. G. Baraniuk submitted in 2015 to ACM Trans. Graph, is incorporated herein by reference, where the authors introduce a total variation prior on the underlying sharp image.

All of the above papers propose to solve an inverse problem of image deconvolution. The main inconvenience of tackling this problem as a deconvolution, on top of the computational burden, is that if the convolution model is not accurate or the kernel is not accurately estimated, the restored image will contain strong artifacts (such us, ringing).

The approach provided herein to deal with the above mentioned problem is radically different. The idea is to fuse all the images in the burst without explicitly estimating the blurring kernels and subsequent inverse problem approach, but taking the information that is less degraded from each image in the burst. The estimation of the "less degraded" information is performed relatively easily as explained further below. The entire algorithm is based on physical properties of the camera (hand) shake and no on priors or assumptions on the image and/or kernel.

Fourier Burst Accumulation

Camera shake originated from hand tremor vibrations has undoubtedly a random nature. The independent movement of the photographer hand causes the camera to be pushed randomly and unpredictably, generating blurriness in the captured image.

Figure 2:
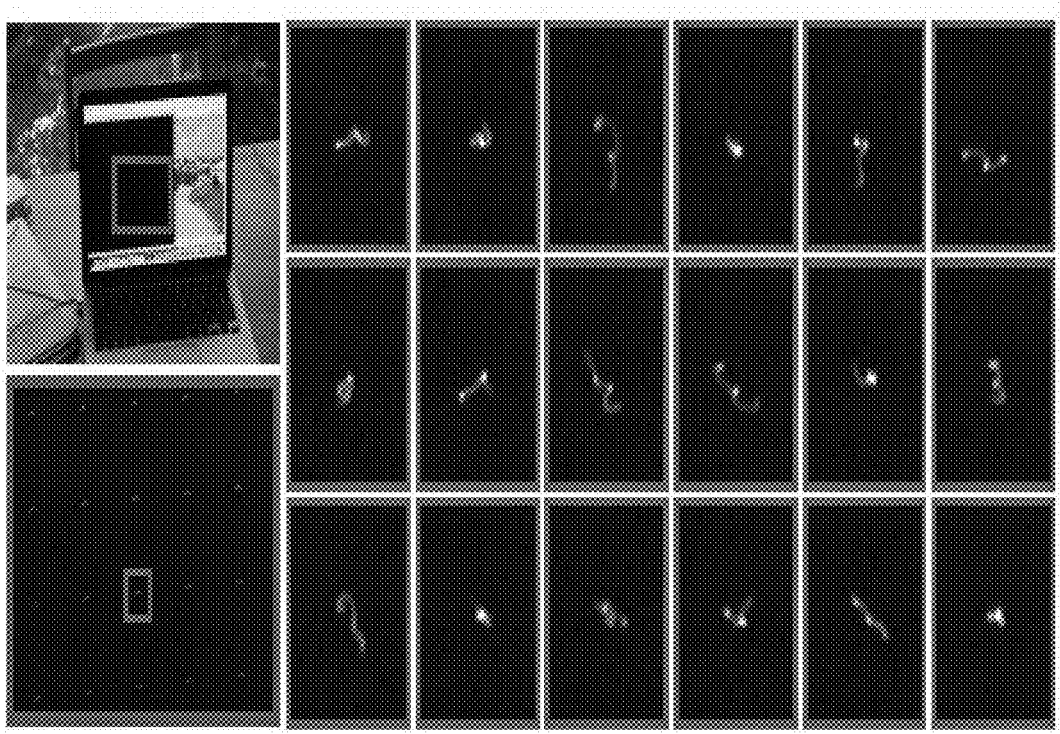
FIG. 2 shows several images taken in a burst mode with a digital single-lens reflex (DSLR) handheld camera showing the random nature of hand tremor and corresponding camera shake, in accordance with one embodiment.

FIG. 2 shows several photographs taken with a digital single-lens reflex (DSLR) handheld camera. When the DSLR handheld camera is set to a burst mode, several photographs are captured sequentially. Due to the random nature of hand tremor, the camera shake blur is mostly independent from one frame to the other. The photographed scene consists of a laptop displaying a black image with white dots. The captured picture of the white dots illustrates the trace of the camera movement in the image plane. If the dots are very small—mimicking Dirac masses—heir photographs represent the blurring kernels themselves. The kernels mostly consist of one-dimensional regular random trajectories. This stochastic behavior will be utilized in the approach provided herein.

Let $\mathfrak{I}$ denote the Fourier Transform and $\hat{k}$ the Fourier Transform of the kernel k. Images are defined in a regular grid indexed by the 2D position x and the Fourier domain is indexed by the 2D frequency $\zeta$. Let us assume, without loss of generality, that the kernel k due to camera shake is normalized such that $\int k(x)dx=1$. The blurring kernel is nonnegative since the integration of incoherent light is always nonnegative. This implies that the motion blur does not amplify the Fourier spectrum, as stated below:

Let $k(x) \geq 0$ and $\int k(x)=1$. Then, $|\hat{k}(\zeta)| \leq 1$, $\forall \zeta$. (Blurring kernels do not amplify the spectrum.)

Proof.

$$|\hat{k}(\zeta)|=|\int k(x)e^{ix\cdot\zeta}dx|\leq \int |k(x)|dx=\int k(x)dx=1. \qquad (1)$$

Most modern digital cameras have a burst mode where the photographer is allowed to sequentially take a series of images, one right after the other. Let us assume that the photographer takes a sequence of M images of the same scene u, $$v_i=u\cdot k_i+n_i, \text{ for } i=1,\ldots,M. \qquad (2)$$

In general, the movement of the camera during any two images of the burst will be essentially independent. Thus, the blurring kernels $k_i$ will be mostly different for different images in the burst. Hence, each Fourier frequency of $\hat{u}$ will be differently attenuated on each frame of the burst. Methods and Systems are provided herein to reconstruct an image whose Fourier spectrum takes for each frequency the value having the largest Fourier magnitude in the burst. Since a blurring kernel does not amplify the Fourier spectrum (Claim 1), the reconstructed image picks what is less attenuated from each image of the burst.

More formally, let p be a non-negative integer, and call Fourier Burst Accumulation (FBA) to the Fourier weighted averaged image, $$u_p(x) = \mathcal{F}^{-1}\left(\sum_{j=1}^{M} w_i(\zeta) \cdot \hat{v}_i(\zeta)\right)(x), \quad (3)$$

$$w_i(\zeta) = \frac{|\hat{v}_i(\zeta)|^p}{\sum_{j=1}^{M} |\hat{v}_j(\zeta)|^p},$$

where, $\hat{u}_i$ is the Fourier Transform of the individual burst image $\hat{v}_i$. The weight $w_i := w_i(\zeta)$ controls the contribution of the frequency $\zeta$ of image $v_i$ to the final reconstruction $u_p$. Given $\zeta$, for p>0, the larger the value of $\hat{v}|_i(\zeta)|$, the more $\hat{v}_i(\zeta)$ contributes to the average, reflecting what was discussed above that the strongest frequency values represent the least attenuated u components.

The integer p controls the aggregation of the images in the Fourier domain. If p=0, the restored image is just the average of the burst (as standard for example in the case of noise only), while if p→∞, each reconstructed frequency takes the maximum value of that frequency along the burst. This is stated in the following claim; the proof is straightforward and it is therefore omitted.

Mean/Max Aggregation

Suppose that $\hat{v}_i(\varsigma)$ for $i = 1, \ldots, M$ are such that $|\hat{v}_i(\varsigma)|$ $$|\hat{v}_{i_1}(\varsigma)| =$$

$$|\hat{v}_{i_2}(\varsigma)| = \ldots = |\hat{v}_{i_q}(\varsigma)| > |\hat{v}_{i_{q+1}}(\varsigma)| \geq |\hat{v}_{i_{q+2}}(\varsigma)| \geq \ldots \geq |\hat{v}_{i_M}(\varsigma)| \text{ and}$$

$w_i(\varsigma)$ is given by (3). If $p = 0$, then $w_i(\varsigma) = \frac{1}{M}, \forall i$ (arithmetic mean pooling), while if $p \to \infty$, then $w_i(\varsigma) = \frac{1}{q}$ for $i = i_1, \ldots, i_q$ and $w_i(\varsigma) = 0$ otherwise (maximum pooling).

The Fourier weights only depend on the Fourier magnitude and hence they are not sensitive to image misalignment. However, when doing the average in (3), the images $v_i$ have to be correctly aligned to mitigate Fourier phase intermingling and get a sharp aggregation. The images in our experiments are aligned using SIFT correspondences and then finding the dominant homography between each image in the burst and the first one (implementation details are given below). This pre-alignment step can be done exploiting the camera gyroscope and accelerometer data.

Dealing with Noise

The images in the burst are blurry but also contaminated with noise. In the ideal case where the input images are not contaminated with noise, (3) is reduced to $$w_i = \frac{|\hat{v}_i|^p}{\sum_{j=1}^{M} |\hat{v}_j|^p} = \frac{|\hat{k}_i \cdot \hat{u}|^p}{\sum_{j=1}^{M} |\hat{k}_j \cdot \hat{u}|^p} = \frac{|\hat{k}_i|^p}{\sum_{j=1}^{M} |\hat{k}_j|^p}, \quad (4)$$

as long as $|\hat{u}|>0$.

Provided in some embodiments is a procedure for weighting more the frequencies that are less attenuated by the different camera shake kernels. Since camera shake kernels have typically a small support, of maximum only a few tenths of pixels, its Fourier spectrum magnitude varies very smoothly. Thus, $|\hat{u}_i|$ can be smoothed out before computing the weights. This helps to remove noise and also to stabilize the weights.

Equivalent Point Spread Function

The aggregation procedure can be seen as the convolution of the underlying sharp image u with an average kernel kFBA given by the Fourier weights in (4), $$u_p = u * k_{FBA} + \bar{n}, \text{ where} \quad (5)$$

$$k_{FBA}(x) = \mathcal{F}^{-1}\left(\sum_{i=1}^{M} w_i(\varsigma) \cdot \hat{k}_i(\varsigma)\right)(x), \quad (6)$$

and $\bar{n}$ is the weighted average of the input noise.

The FBA kernel can be seen as the final point spread function (PSF) obtained by the aggregation procedure (assuming a perfect alignment). The closer the FBA kernel is to a Dirac function, the better the Fourier aggregation works. By construction, the average kernel is made from the least attenuated frequencies in the burst—given by the Fourier weights. However, since arbitrary convolution kernels may also introduce phase distortion, there is no guarantee in general that this aggregation procedure will lead to an equivalent PSF that is closer to a Dirac mass.

Figure 3:
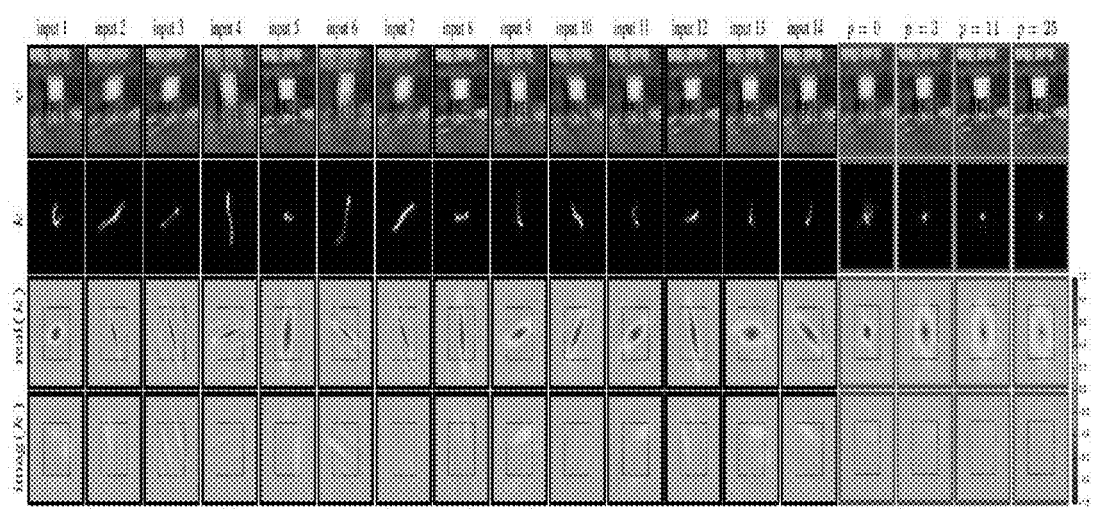
FIG. 3 shows several images having real camera shake kernels computed using a snapshot captured with a tripod as a reference, in accordance with some embodiments.

FIG. 3 shows a series of input images and the respective motion kernels. The motion kernels are estimated using a sharp snapshot, captured with a tripod as a reference. The first row shows a crop of each input image (frames 1 to 14) and the proposed Fourier Burst Accumulation (from (3), no additional sharpening used). The kernels are generally regular uni-dimensional trajectories (second row). The four last columns in the second row show the resultant point spread functions (PSF) after the Fourier weighted average for different values of p. The kernel due to the Fourier average with p>0 is closer to a Delta function, showing the success of the method disclosed herein. The two bottom rows show the Fourier real and imaginary parts of each blurring kernel (the red box indicated the π/2 frequency). The real part is mostly positive and significantly larger than the imaginary part, implying that the blurring kernels do not introduce significant phase distortions. This might not be the case for large motion kernels and uncommon handshakes. Using the sharp reference $u_{ref}$ the blurring kernel $k_i$ is solved by minimizing the least squares distance to the blurred acquisition $v_i$, namely, $\|u_{ref}*k_i - v_i\|$ (described by M. Delbracio, P. Muse, A. Almansa and J. M Morel in 2012, entitled "The Non-parametric Sub-pixel Local Point Spread Function Estimation Is a Well Posed Problem," Int. J. Comput. Vision, vol. 96, pp. 175-194, incorporated herein by reference). The figure also shows the real and imaginary parts of the Fourier kernels spectra. As one can see for most of the kernels the real part is mostly positive and considerably larger than the imaginary part. This implies that the less attenuated frequencies will not present significant phase distortion. This assumption may not be accurate for large motion kernels, an unexpected scenario in ordinary camera shake. In this example, as p increases the equivalent point spread function gets closer to a Dirac function. In particular, the FBA kernel for p>0 attenuates significantly less the high frequencies than the regular arithmetic average (p=0), leading to a sharper aggregation.

Fourier Burst Accumulation Analysis

A. Anatomy of the Fourier Accumulation

The value of p sets a tradeoff between sharpness and noise reduction. Although one would always prefer to get a sharp image, due to noise and the unknown Fourier phase shift introduced by the aggregation procedure, the resultant image would not necessary be better as p->∞.

FIG. 4 shows an example of the Fourier Burst Accumulation for a burst of 7 images, and the amount of contribution of each frame to the final aggregation. Weight s distribution of the Fourier Burst Aggregation when changing the value of p is provided. As p grows, the weights are concentrated in fewer images (FIGS. 4c and 4d). Also, the weights maps clearly show that different Fourier frequencies are recovered from different frames (FIG. 3 a). In this example, the high frequency content is uniformly taken from all the frames in the burst. This produces a strong noise reduction behavior, in addition to the sharpening effect. The difference between FIGS. 4c and 4d lies in the fact that a large weight may not necessarily reflect a large contribution to the final image, although this is generally the case.

To make explicit the contribution of each frame to the final image, the FBA weighted average (3) can be decomposed into its contributions:

$$u_p(x) = \sum_{i=1}^{M} \mathcal{F}^{-1}(w_i(\zeta) \cdot \hat{v}_i(\zeta))(x) := \sum_{i=1}^{M} \bar{v}_i(x).$$

Figure 5:
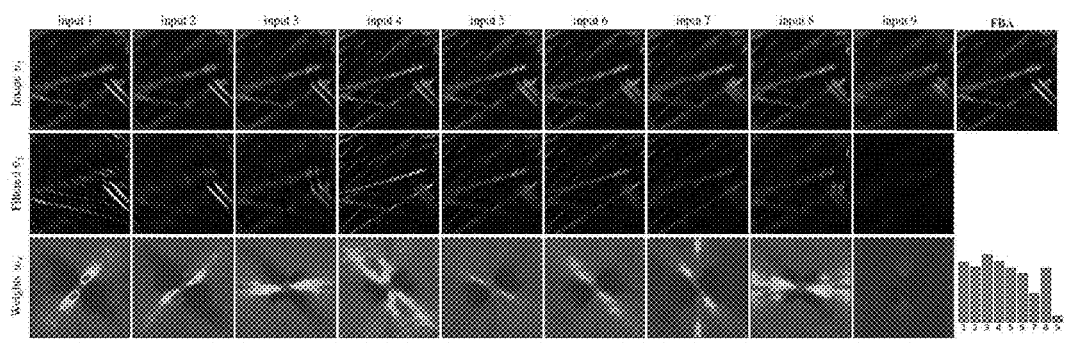
FIG. 5 shows the anatomy of Fourier aggregation, in accordance with some embodiments.

Each term $\bar{v}_i$ is the result of applying the corresponding Fourier weights $w_i$ (a filter) to the respective input frame $v_i$. Each of these terms for a crop of a real burst is in FIG. 5. Each frame contributes differently in that none of the frames capture all the structure present in the final aggregated image. FIG. 5 shows the anatomy of the Fourier aggregation. The first row shows a crop of each input image $v_i$ (frames 1 to 9) and the proposed Fourier Burst Accumulation for p=11 (from (3), no additional sharpening has been used). The second row shows the contribution of each frame to the final aggregation $\bar{v}_i$ (rescaled for better visualization). The Fourier burst aggregation results from the aggregation of different components presented in different frames. This is also confirmed by the Fourier weights distribution shown in the bottom row. The bar plot shown on the right of FIG. 5 indicated the total contribution of each frame to the Fourier burst accumulation image. None of the input images contain all the structure presented in the final aggregation.

B. Statistical Performance Analysis

To show the statistical performance of the Fourier weighted accumulation, empirical analysis was carried out by applying the proposed aggregation with different values of p. The motion kernels were simulated following the model described by F. Gavant, L. Alacoque, A. Dupret, and D. David in 2011, entitled "A physiological camera shake model for image stabilization systems," IEEE Sensors, incorporated herein by reference, where the (expected value) amount of blur is controlled by a parameter related to the exposure time Texp. The simulated motion kernels were applied to a sharp clean image (ground truth). The number of images was also controlled in the burst M and the noise level in each frame s. The kernels were generated by simulating the random shake of the camera from the power spectral density of measured physiological hand tremor as described by B. Carignan, J. F. Daneault, and C. Duval in 2010, entitled "Quantifying the importance of high frequency components on the amplitude of physiological tremor," Exp. Brain Res., vol. 202, no. 2, pp. 299-306, incorporated herein by reference. All the images were aligned by pre-centering the motion kernels before blurring the underlying sharp image.

Figure 6:
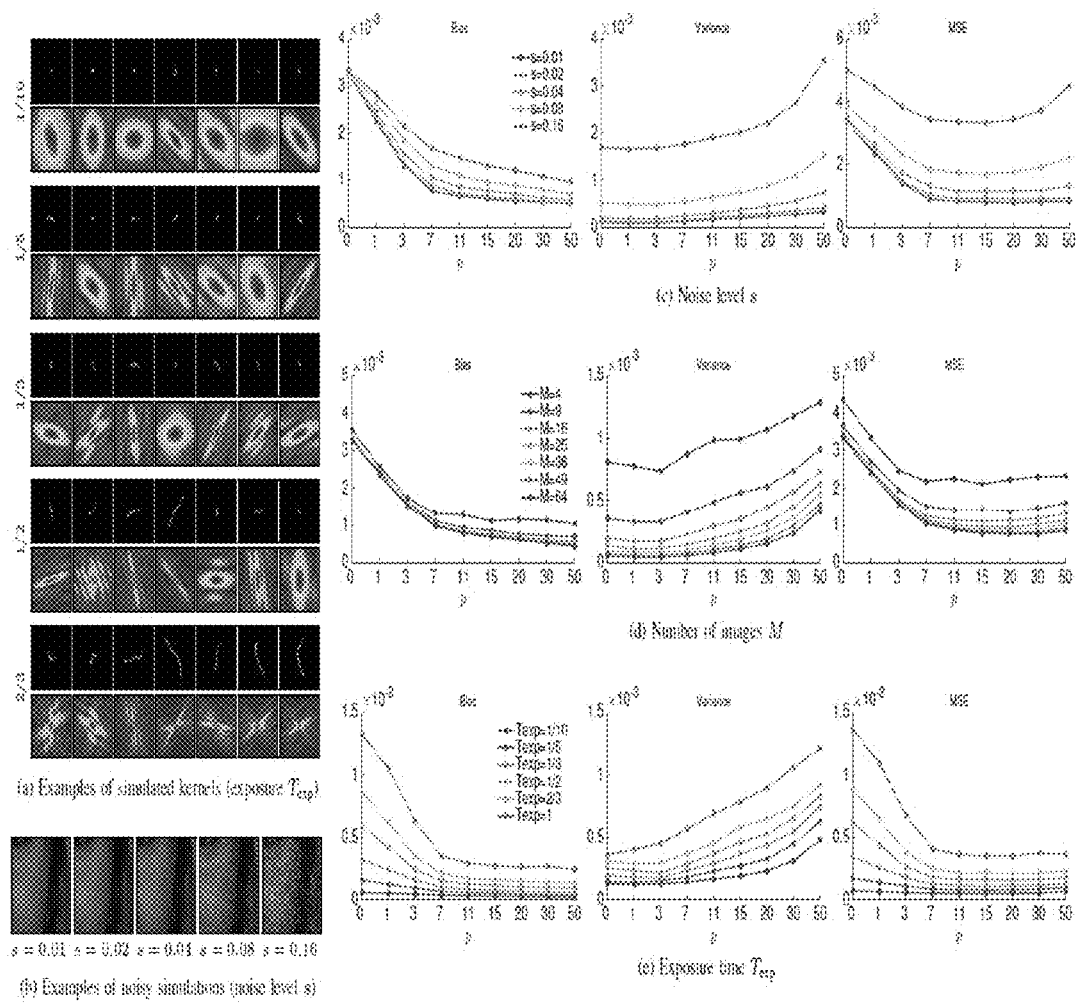
FIG. 6 shows several examples of simulated kernels for different exposures, in accordance with some embodiments.

FIG. 6 shows several different realizations for different exposure values Texp. The amount of blur not only depends on the exposure time but also on the focal distance, user expertise, and camera dimensions and mass as described by G. Boracchi and A. Foi in 2012, entitled "Modeling the performance of image restoration from motion blur," IEEE Trans. Image Process., vol. 21, no. 8, pp. 3502-3517, incorporated herein by reference. However, for simplicity, all these variables were controlled by the single parameter Texp. FIG. 6(a) shows simulated kernels due to hand tremor as described in F. Gavant et. al (referenced above). Each row shows a set of simulated kernels (left panel) for different exposures Texp=1/10, 1/5, 1/3, 1/2, 2/3, and the respective Fourier spectrum magnitude (bottom panel). The parameter Texp controls the amount of expected blur. (b) Simulated noise levels. Average algorithm performance with respect to p when changing (c) the amount of noise s in the input images, (d) the number of images in the burst M, and (e) the exposure time Texp. The rest of the parameters are set to M=16, s=0.04 and Texp=1/3, unless otherwise specified. With short exposures, the arithmetic average (p=0) produces the best mean square error (MSE) since the images are not blurred. The bias does not depend on M, but the variance can be significantly reduced by taking more images (light accumulation procedure). Noise effects the bias and the variance terms (with the exception of p=0 where the bias is unaffected).

In an example, thousands of different motion kernels and Gaussian noise realizations were randomly sampled, and then applied the Fourier aggregation procedure for each different configuration (Texp, M, s) several times. The empirical MSE between the ground truth reference and each FBA restoration was computed and averaged over hundreds of independent realizations. The mean square error was decomposed into the bias and variance terms, namely MSE $(u_p)$=bias$(u_p)^2$+var$(u_p)$, to help visualize the behavior of the algorithm.

FIG. 5 shows the average algorithm performance when changing the acquisition conditions. In general, the larger the value of p the smaller the bias and the larger the variance. There is a minimum of the mean square error for p∈[7, 30]. This is reasonable since there exists a tradeoff between variance reduction and bias. Although both the bias and the variance are affected by the noise level, the qualitative performance of the algorithm remains the same. The bias is not altered by the number of frames in the burst but the variance is reduced as more images are used, implying a gain in the expected MSE as more images is used. On the other hand, the exposure time mostly affects the bias, being much more significant for larger exposures as expected.

C. Impact of Burst Misalignment

Misalignment of the burst can have an impact on the quality of the aggregated image. For the general case where images are noisy but also degraded by anisotropic blur the problem of defining a correct alignment is not well defined.

In what follows, the burst is correctly aligned if each $v_i$ satisfies $v_i = u * k_i + n_i$, with the blurring kernel $k_i$ having vanishing first moment. That is, $\int k_i(x)x dx = 0$. This constraint on the kernel implies that the kernel does not drift the image u, so each $v_i$ is aligned to u.

To evaluate the impact of misalignment, the particular setting in which the error due to registration is a pure shift is considered. Although being a simplified case, this helps to understand the general algorithm performance as a function of the parameter p and the level of misalignment. In this particular case the translation error can be absorbed in a phase shift of the kernel. Although the weights will not change, since they only depend on the Fourier magnitude, the average in will be out-of-phase due to the misalignment of the images $v_i$. This results in blur but also on image artifacts.

In one example, several thousand kernels were simulated and centered by forcing to have vanishing first moment. A Gaussian random 2D shift was introduced to each blurring kernel (i.e., the first moment of the kernel is shifted) with zero mean and standard deviation ϵ controlled by a parameter ϵ to simulate the misalignment. The average displacement is approximately 1.25ϵ (shown in the table within FIG. 7)

Figure 7:
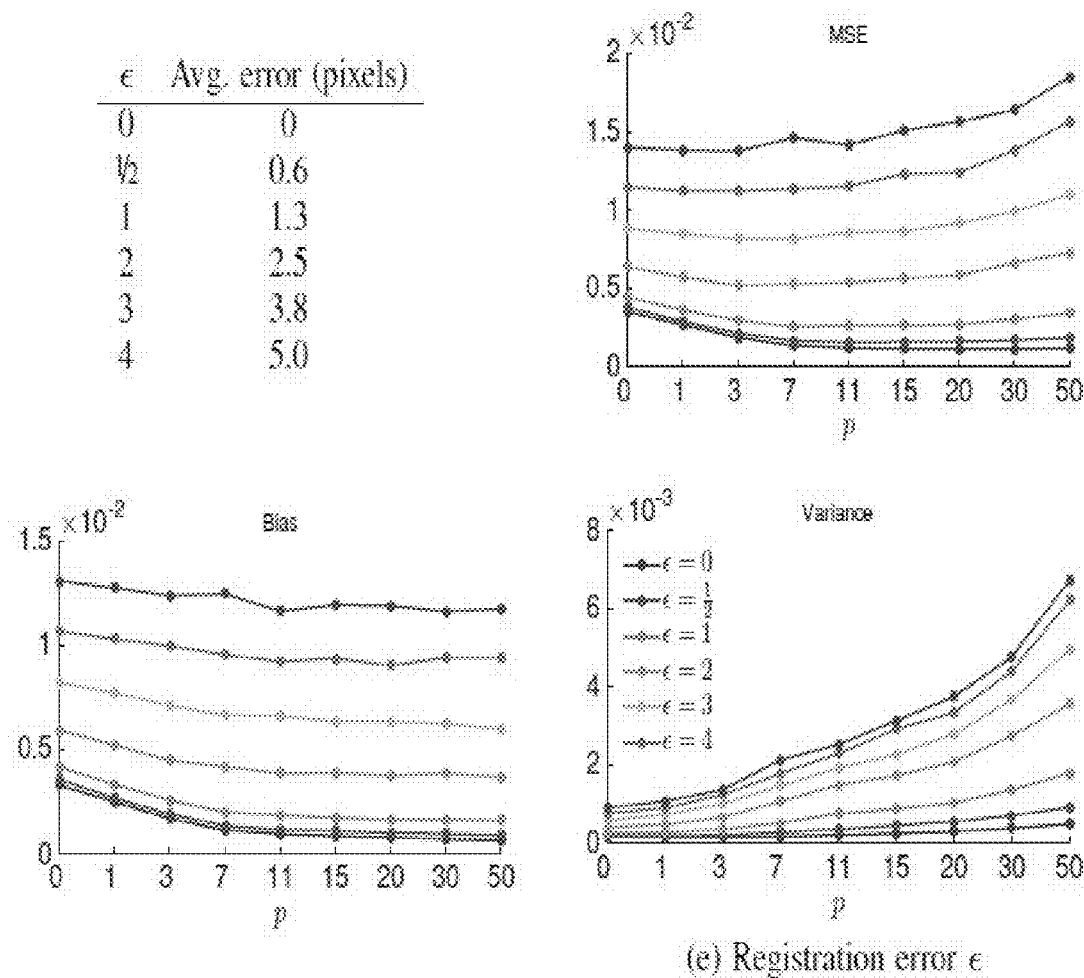
FIG. 7 shows the impact of misalignment, in accordance with some embodiments.

FIG. 7 shows the performance of the algorithm with change in the amount of error in the registration (from 0-5 pixels in average) and the value of p controlling the FBA aggregaion. As the alignment error is more significant, the mean square error increases as expected. When the misalignment error is large (ϵ>2), the best is to use low p values (close to arithmetic mean). On the other hand, when the misregistration error is low, large p values will produce lower reconstruction error (MSE). For shift errors in the order of 1 pixel, the p value giving the minimum MSE is in p∈[7, 20]. In general, the bias is always reduced with p while the variance is increased. This is a direct consequence of the fact that smoothness is reduced when increasing the p value (see in FIG. 4 how the energy is concentrated in fewer images as p→∞, indicating less smoothing).

D. Comparison to Classical Lucky Imaging Techniques

Lucky imaging techniques, very popular when imaging through atmospheric turbulence, seek to select and average the sharpest images in a video. The Fourier weighting scheme can be seen as a generalization of the lucky imaging family. Lucky imaging selects (or weights more) frames/regions that are sharper but without paying attention to the characteristics of the blur. Thus, when dealing with camera shake, where frames are randomly blurred in different directions, classical lucky imaging techniques will have a suboptimal performance. In contrast, trying to detect the Fourier frequencies that were less affected by the blur and then build an image with them may be preferred, which the Fourier Burst Accumulation seeks to achieve.

A selection scheme for astronomic images, based on the relative strength of signal for each frequency in the Fourier domain was described by V. Garrel, O. Guyon, and P. Baudoz describes in 2012 entitled "A highly efficient lucky imaging algorithm: Image synthesis based on Fourier amplitude selection," Publ. Astron. Soc. Pac., vol. 124, no. 918, pp. 861-867, incorporated herein by reference. Given a spatial frequency, only the Fourier values having largest magnitude are averaged. The user parameter is the percentage of largest frames to be averaged (typically ranging from 1%-10%). This method was developed for the particular case of astronomical images, where astronomers capture videos having thousands of frames (for example 9000 frames in Garrel et. al.). The algorithm proposed herein does not specify a constant number of frames to be averaged as provided in Garrel et. al. The Fourier weighting scheme selects the total contribution of each frame depending on the relative strength of the Fourier magnitudes. It can be shown that this generalized lucky imaging procedure produces astronomical images of higher resolution and better signal to noise ratio than traditional lucky image fusion schemes.

Traditional Lucky imaging techniques are based on evaluating the quality of a given frame. In astronomy, the most common sharpness measure is the intensity of the brightest spot, being a direct measure of the concentration of the system's point spread function. However, this is not applicable in the context of classical photography.

Locally estimating the level of sharpness using the integral of the energy of the image gradient in a surrounding region (i.e., the Dirichlet energy) is described by G. Haro, A. Buades, and J. M. Morel in 2012, entitled "Photographing paintings by image fusion," SIAM J. Imag. Sci., vol. 5, no. 3, pp. 1055-1087 incorporated herein by reference. If all the images in the series have similar noise level, the Dirichlet energy provides a direct way of ordering the images according to sharpness. (i.e., large Dirichlet energy implies sharpness).

Let $v_i$ i=1, . . . , M, be a series of registered images of the same scene, the per-pixel Dirichlet energy weights are $$w_{dirichlet}^{i}(x) = \int_{\Omega_x} |\nabla v_i(x)|^2 dx, \quad (7)$$

where, $\Omega_x$ is a block of (100×100) pixels around the pixel x. In practice, the Dirichlet weights vary poorly with camera shake blur, so although blurry images will contribute less to the final image, their contribution will be still significant.

Joshi and Cohen proposed using a combination of sharpness and selectivity per-pixel weights to determine the contribution of each pixel to the restored image (described in N. Joshi and M. F. Cohen in 2010 entitled, "Seeing Mt. Rainier: Lucky imaging for multiimage denoising, sharpening, and haze removal," In Proc. IEEE Int. Conf. Comput, Photogr. (ICCP), incorporated herein by reference. The sharpness weight is built from the local intensity of the image Laplacian and it is pondered by a local selectivity term. The selectivity term enforces more noise reduction in smooth/flat areas. The final sharpness-selectivity weights are $$w_{shrp\text{-}sel}^{i}(x) = u_{tex}^{i}(x)^{\gamma(x)} \quad (8)$$

where
$w_{tex}^i(x) = |\Delta v_i(x)| \div \max_x |\Delta v_i(x)|$ is the local sharpness measure, and
$\gamma(x) = \lambda |\Delta v_a(x)| \div \max_x |\Delta v_a(x)|$ is the selectivity term controlled by a parameter $\lambda$. The average of all input frames is denoted by $v_a(x)$.

In all cases, the final image is computed as a per-pixel weighted average of the input images, $$v_{lucky}(x) = \frac{\sum_{i=1}^{M} w_i(x) \cdot v_i(x)}{\sum_{i=1}^{n} w^i(x)}.$$

Figure 8:
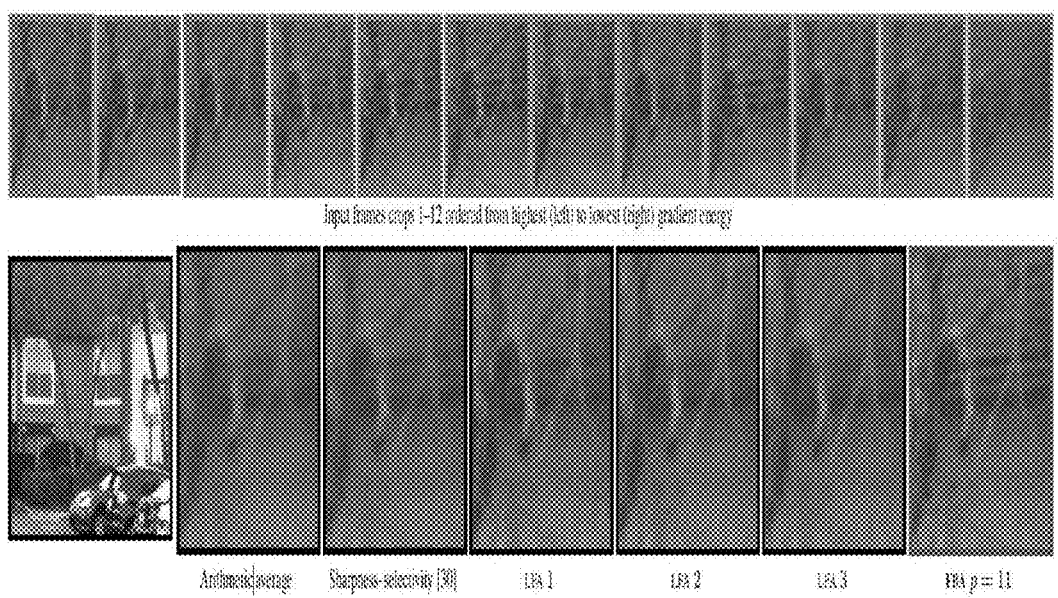
FIG. 8 shows comparison to lucky imaging techniques on a real data burst of a building, in accordance with some embodiments.

FIG. 8 shows a comparison of these two approaches to the proposed Fourier Burst Accumulation. The final sharpening step was not included to compare all the approaches, as this last step may be included in all of them. Since the weighted averaged image using Garrel et al. did not show any difference with respect to the arithmetic average, the total Dirichlet energy was instead used to rank all the input images and then average only the top K (the sharpest ones). This method is termed Lucky frame average (LFA) and was tested for different values of K=1, 2, 3.

The weights provided by M. A. Fischer and R. C. Bolles in 1981, entitled "Random sample consensus: a paradigm for model fitting with applications to image analysis and automated cartography," Comm. ACM, 24(56):381-395, 1981, incorporated herein by reference, provides an oversmoothed image with significant less noise. However, the sharpest frame detected (LFA, K=1) is still blurred and noisier than the result given by the Fourier Burst Accumulation with p=11. As more lucky frames are averaged (LFA 2 and LFA 3), more noise is eliminated at the expense of introducing blur in the final image.

Algorithm Implementation

The proposed burst restoration algorithm is built on three main blocks: Burst Registration, Fourier Burst Accumulation, and Noise Aware Sharpening as a post-processing. These are described in what follows.

Burst Registration.

There are several ways of registering images (example provided in B. Zitova and J. Flusser, "Image registration methods: a survey," Image vision Comput., vol. 21, no. 11, pp. 977-1000, 2003, incorporated herein by reference). In one example, image correspondences are used to estimate the dominant homography (or in some embodiments, an affine homography is used) relating every image of the burst and a reference image (the first one in the burst). The homography assumption is valid if the scene is planar (or far from the camera) or the viewpoint location is fixed, e.g., the camera only rotates around its optical center. Image correspondences are found using SIFT features (described by D. Lowe in 2004, entitled "Distinctive image features from scale-invariant keypoints," Int. J. Comput. Vision, vol. 60, pp. 91-110, incorporated herein by reference) and then filtered out through the ORSA algorithm (described by L. Moisan, P. Moulon, and P. Monasse in 2012, entitled "Automatic homographic registration of a pair of images, with a contrario elimination of outliers," J. Image Proc. On Line (IPOL), vol. 2, pp. 56-73, incorporated herein by reference), a variant of the so called RANSAC method (described by M. A. Fischler and R. C. Bolles). To mitigate the effect of the camera shake blur, SIFT features having a larger scale than $\sigma_{min}=1.8$ are only detected.

Fourier Burst Accumulation

Given the registered images $\{v_i\}_{i=1}^{M}$ the corresponding Fourier transforms $\{\hat{v}_i\}_{i=1}^{M}$ is directly computed. Since camera shake motion kernels have a small spatial support, their Fourier spectrum magnitudes vary very smoothly. Thus, $|\hat{v}_i|$ can be lowpass filtered before computing the weights, that is, $|\tilde{v}_i|=G\sigma|\hat{v}_i|$, where $G\sigma$ is a Gaussian filter of standard deviation $\sigma$. The strength of the low pass filter (controlled by the parameter $\sigma$) should depend on the assumed motion kernel size (the smaller the kernel the more regular its Fourier spectrum magnitude). In the implementation provided herein, standard deviation $\sigma=\min(m_h,n_w)/k_s$, where $k_s=50$ pixels and the image size is $m_h \times m_w$ pixels. Although this low pass filter is important, the results are not too sensitive to the exact value of standard deviation $\sigma$. (see FIG. 9)

Figure 9:
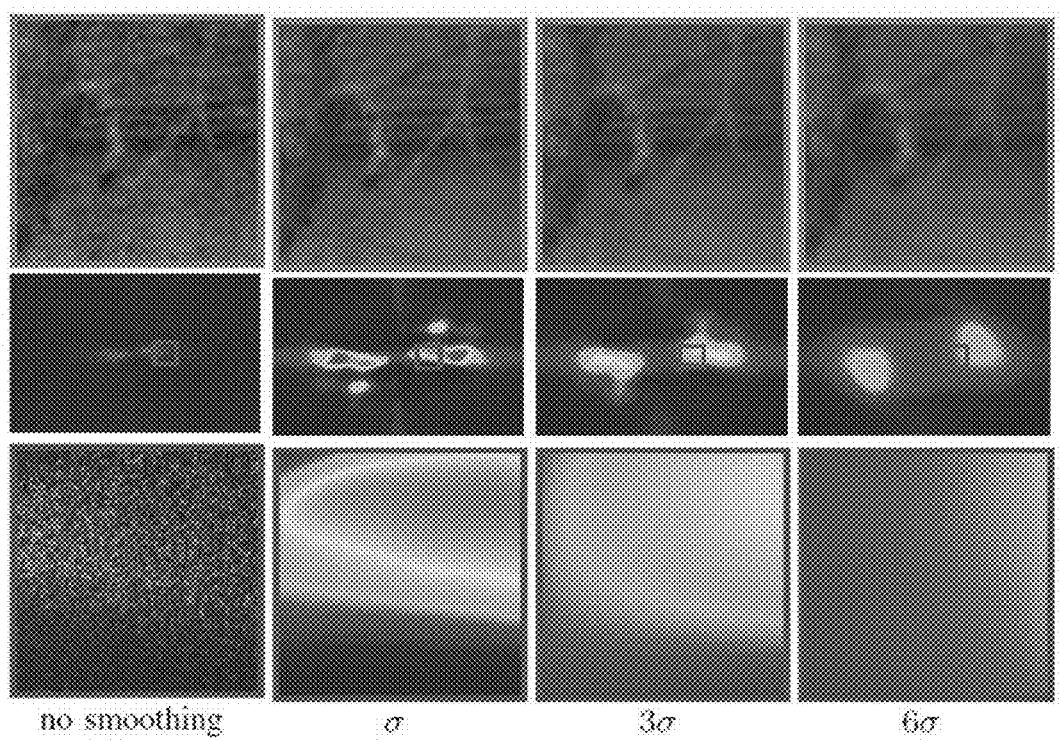
FIG. 9 shows the impact of smoothing the Fourier weights, in accordance with some embodiments.

FIG. 9 shows one example of the impact of smoothing the Fourier weights. To eliminate artifacts and noise, $|\hat{v}_i|$ are smoothed before computing the weights $w_i$. Top row shows the results of the FBA average (for the burst shown in FIG. 8. Middle row shows the Fourier weights, and the bottom row a crop of the Fourier weights, when considering different levels of Gaussian smoothing (no smoothing, $\sigma$, $3\sigma$, $6\sigma$). The strength of the low pass filter is controlled by the parameter $\sigma=\min(m_h,m_w)/k_s$, where $k_s=50$ pixels and the image size is $m_h \times m_w$ pixels. As shown in the left column (no smoothing), this filtering step provides stabilization to the Fourier weights and also helps to remove noise. The results were found to be stable for a large range of smoothing levels.

The final Fourier burst aggregation is (note that the smoothing is only applied to the weights calculation)

$$u_p = \mathcal{F}^{-1}\left(\sum_{i=1}^{M} w_i \cdot \hat{v}_i\right) \cdot w_i = \frac{|\tilde{v}_i|^p}{\sum_{j=1}^{M} |\tilde{v}_j|^p}. \quad (9)$$

The above process can be extended to color images also. For color images, the accumulation is done channel by channel using the same Fourier weights for all channels. The weights are computed by arithmetically averaging the Fourier magnitude of the channels before the low pass filtering step.

Noise Aware Sharpening

While the results of the Fourier burst accumulation are already very good, considering that the process so far has been computationally non-intensive, one can optionally apply a final sharpening step if resources are still available. The sharpening must contemplate that the reconstructed image may have some remaining noise. Thus, a denoising algorithm is first applied (the NLBAYES algorithm as used (described by M. Lebrun, A. Buades, and J. M. Morel in 2013, entitled "Implementation of the "Non Local Bayes" image denoising algorithm," J. Image Proc. On Line (IPOL), vol. 3, pp. 1-42, incorporated herein by reference), then on the filtered image a Gaussian sharpening was applied (also known as unsharp masking, which entails subtracting a Gaussian blurred version of the image—for details see Algorithm 1. Lines 13-14). To avoid removing fine details a percentage of what has been removed during the denoising step is finally added back. The complete method is detailed in Algorithm 1 shown in FIG. 10.

Memory and Complexity Analysis

Once the images are registered, the algorithm runs in $O(M \cdot m \cdot \log m)$, where $m=m_h \times m_w$ is the number of image pixels and M the number of images in the burst. The heaviest part of the algorithm is the computation of M FFTs, very suitable and popular in VLSI implementation and therefore the method has a very low level of complexity. Regarding memory consumption, the algorithm does not need to access all the images simultaneously and can proceed in an online fashion. This keeps the memory requirements to only three buffers: one for the current image, one for the current average, and one for the current weights sum.

Figure 11:
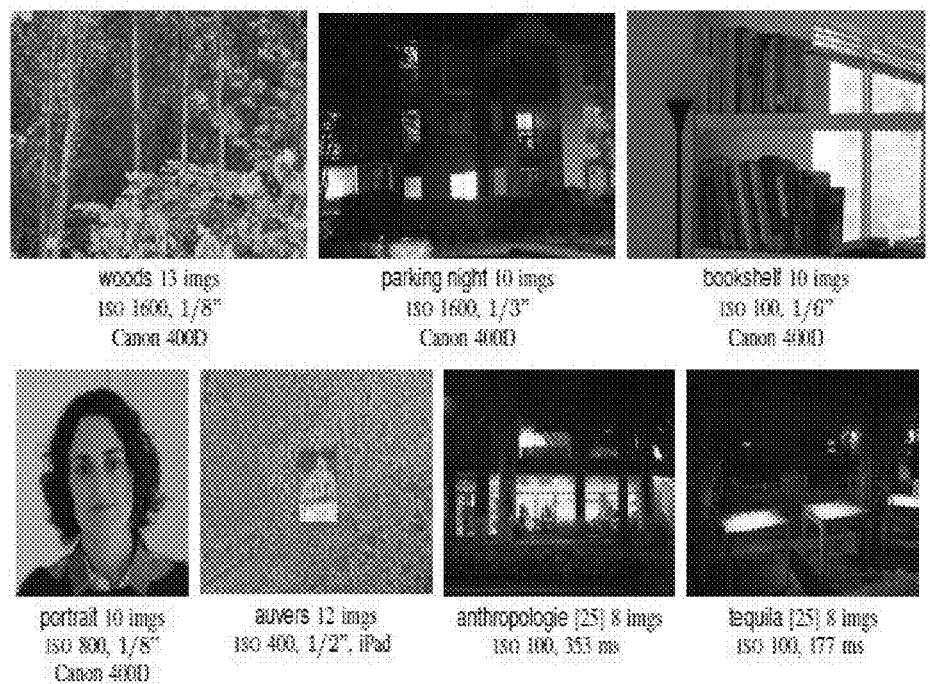
FIG. 11 shows restoration of image bursts captured with two different cameras, in accordance with some embodiments.
Figure 14:
FIG. 14 shows real data burst deblurring results and comparison to multi-image blind deconvolution algorithms, in accordance with some embodiments.
Figure 16:
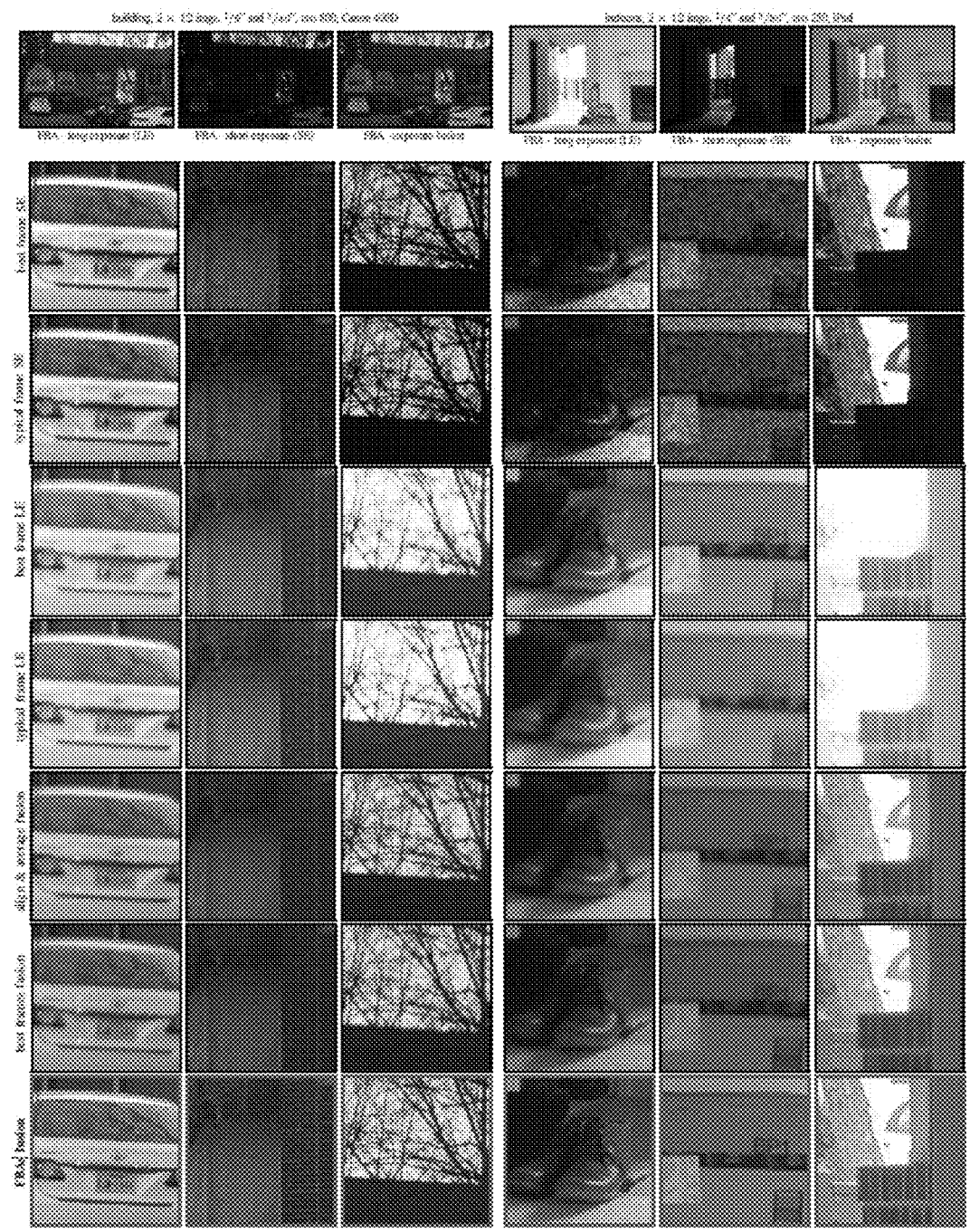
FIG. 16 shows several examples of HDR burst exposure fusion, in accordance with some embodiments.

Several handheld bursts with different number of images were captured using a DSLR camera and also using a back camera of a tablet. The full restored images and the details of the camera parameters are shown in FIG. 11 and FIG. 16. FIG. 9 shows the restoration of image bursts captured with two different cameras. The number of frames, the ISO sensitivity and the exposure time is indicated for each burst. FIG. 14 shows two different examples of fusion of two 12-image bursts captured with two different exposure levels. On top, the FBA average of each burst (left and middle) and the HDR fusion of these two images using (right). Below, image crops of the best shot (sharpest, manually selected) in each burst and another typical in the series; the exposure fusion using the regular align and average to combine all the images of a burst, the exposure fusion using the best shot in each series, and the fusion using the proposed Fourier weighted average. Some of the crops have been rescaled to improve their contrast. The photographs FIG. 11 and FIG. 16 contain complex structure, texture, noise and saturated pixels, and were acquired under different lighting conditions. All the results were computed using p=11.

Comparison to Multi-Image Blind Deblurring

Since this problem is typically addressed by multi-image blind deconvolution techniques, two state-of-the-art algorithms were selected for comparison. The first algorithm used for comparison is described by H. Zhang, D. Wipf, and Y. Zhang in 2013 entitled "Multi-image blind deblurring using a coupled adaptive sparse prior," in In Proc. IEEE Conf. Comput. Vis. Pattern Recognit. (CVPR), incorporated herein by reference. The second algorithm used for comparison is described by F. Sroubek and P. Milanfar in 2012 entitled "Robust multichannel blind deconvolution via fast alternating minimization," IEEE Trans. Image Process., vol. 21, no. 4, pp. 1687-1700, incorporated herein by reference. Both algorithms are built on variational formulations and estimate first the blurring kernels using all the frames in the burst and then do a step of multi-image non-blind deconvolution, requiring significant memory for normal operation. The algorithms rely on parameters that were manually tuned to get the best possible results. We also compare to the simple align and average algorithm (which indeed is the particular case p=0).

Figure 12:
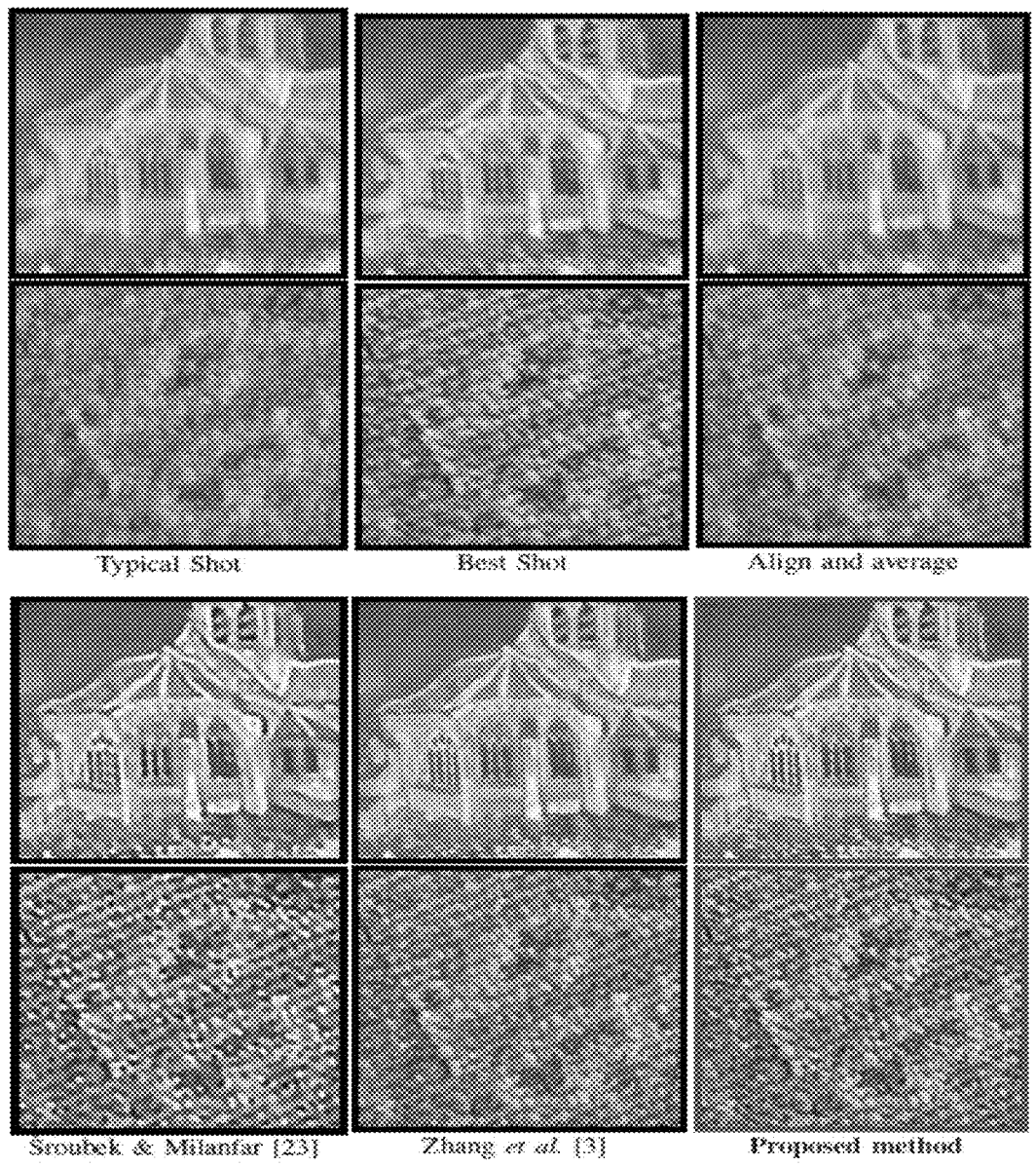
FIG. 12 shows real data burst deblurring results and comparison with multi-image blind deconvolution methods, in accordance with some embodiments.
Figure 13:
FIG. 13 shows real data burst deblurring results and comparison with multi-image blind deconvolution methods, in accordance with some embodiments.

FIGS. 12, 13 and 14 show some crops of the restored images by all the algorithms. In addition, we show two input images for each burst: the best one in the burst and a typical one in the series. The proposed algorithm obtains similar or better results than the one by Zhang et al., at a significantly lower computational and memory cost. Since this algorithm explicitly seeks to deconvolve the sequence, if the convolution model is not perfectly valid or there is misalignment, the restored image will have deconvolution artifacts. This is clearly observed in the bookshelf sequence where Zhang et al. produces a slightly sharper restoration but still has ringing artifacts (see Jonquet book images in FIG. 14). Also, it is hard to read the word "Women" in the spine of the red book in FIG. 14. Due to the strong assumed priors, Zhang et al. generally leads to very sharp images but it may also produce overshooting/ringing in some regions like in the brick wall (parking night).

The proposed method clearly outperforms Sroubek et al. in all the sequences. The Sroubek et al. algorithm introduces strong artifacts that degraded the performance in most of the tested bursts. Tuning the parameters was not trivial since this algorithm relies on 4 parameters that have been linked to a single one (named 1) which was used to get the best possible performance.

The approach provided herein provides for a regular align and average algorithm that produces significantly sharper images while keeping the noise reduction power of the average principle. In some examples with numerous images in the burst (e.g., see the parking night sequence), there might already be a relatively sharp image in the burst (lucky imaging). The algorithm proposed herein does not need to explicitly detect such "best" frame, and naturally uses the others to denoise the frequencies not containing image information but noise.

Execution Time

Once the images are registered, the proposed approach runs in only a few seconds in our Matlab experimental code, while Zhang et al. needs several hours for bursts of 8-10 images. Even if the estimation of the blurring kernels is done in a cropped version (i.e., 200×200 pixels region), the multi-image non-blind deconvolution step is very slow, taking several hours for 6-8 megapixel images.

Multi-Image Non-Blind Deconvolution

Figure 15:
FIG. 15 shows the comparison of restoration results with Park & Levoy's method, in accordance with some embodiments.

FIG. 15 shows the algorithm results in two sequences (namely "anthropologie" and "tequila") described by S. H. Park and M. Levoy in 2014, entitled "Gyro-based multi-image deconvolution for removing handshake blur," In Proc. IEEE Conf. Comput. Vis. Pattern Recognit. (CVPR), incorporated herein by reference. The algorithm proposed in Park et al. uses gyroscope information present in new camera devices to register the burst and also to have an estimation of the local blurring kernels. Then a more expensive multi-image non-blind deconvolution algorithm is applied to recover the latent sharp image. The algorithm proposed herein achieves similar results without explicitly solving any inverse problem nor using any information about the motion kernels.

HDR Imaging: Multi-Exposure Fusion

In many situations, the dynamic range of the photographed scene is larger than the one of the camera's image sensor. One solution to this problem is to capture several images with varying exposure settings and combine them to produce a single high dynamic range high-quality image.

However, in dim light conditions, large exposure times are needed, leading to the presence of image blur when the images are captured without a tripod. This presents an additional challenge. This may be solved by the proposed algorithm by expanding its scope to capture several bursts, each one covering a different exposure level. Then, each of the bursts is processed with the FBA procedure leading to a clean sharper representation of each burst. The obtained sharp images can then be merged to produce a high quality image using any existent exposure fusion algorithm.

FIG. 16 shows the results of taking two image bursts with two different exposure times, and separately aggregating them using the proposed algorithm. An exposure fusion algorithm described by W. Zhang and W. K. Cham in 2010 (entitled, "Gradient-directed composition of multi-exposure images," in In Proc. IEEE Conf. Comput. Vis. Pattern Recognit. (CVPR), incorporated herein by reference) was applied to get a clean tone mapped image from the two burst representations. The fusion is much sharper and cleaner when using the Fourier Burst Accumulation for combining each burst than the one given by the arithmetic average or the best frames in each burst.

In one embodiment, an algorithm is provided to remove the camera shake blur in an image burst. The algorithm is built on the idea that each image in the burst is generally differently blurred; this being a consequence of the random nature of hand tremor. By performing a weighted average in the Fourier domain, an image is reconstructed by combining the least attenuated frequencies in each frame. Experimental results showed that the reconstructed image is sharper and less noisy than the original ones.

The algorithm proposed herein has several advantages. First, it does not introduce typical ringing or over-shooting artifacts present in most deconvolution algorithms. This is avoided by not formulating the deblurring problem as an inverse problem of deconvolution. The algorithm produces similar or better results than the state-of-the-art multi-image deconvolution while being significantly faster and with lower memory footprint.

Video Deblurring Via Efficient Fourier Aggregation

Similar to still-images, videos captured with hand-held cameras often suffer from a significant amount of blur, mainly caused by the inevitable natural tremor of the photographer's hand. In some embodiments, an algorithm is provided herein that removes blur due to camera shake by combining information in the Fourier domain from nearby frames in a video. The dynamic nature of typical videos with the presence of multiple moving objects and occlusions makes this problem of camera shake removal extremely challenging, in particular when low complexity is needed. Given an input video frame, a consistent registered version of temporally adjacent frames is created. Then, the set of consistently registered frames is block-wise fused in the Fourier domain with weights depending on the Fourier spectrum magnitude. The method provided herein is motivated from the physiological fact that camera shake blur has a random nature and therefore, nearby video frames are generally blurred differently. Experiments with numerous videos recorded in the wild, along with extensive comparisons show that the proposed algorithm achieves state-of-the-art results while at the same time being much faster than other techniques. Videos captured using hand-held cameras often contain image blur which significantly damages the overall quality. Typical blur sources can be separated into those mainly depending on the scene (e.g., objects moving, depth-of-field), and those depending on the camera and the movement of the camera (camera shake, autofocusing).

Image blur due to camera shake can be visually very disturbing. Fortunately, in many cases, this blur is temporal, non-stationary and of rapid change. This implies that, in general, the blur due to camera shake in each frame will be different from the blur in nearby frames. In this work, an algorithm is provided that exploits this phenomenon by aggregating information from nearby frames to improve the quality of every frame in the video sequence. Going from a static-scene multi-image deblurring algorithm to an algorithm for removing camera shake blur in dynamic videos, while keeping the simplicity and complexity low, can be extremely challenging. This is the reason why, in general, multi-image deblurring algorithms have not been (yet) successfully extended to remove camera shake blur in real dynamic videos. Described below are the methods and calculations for some embodiments of the deblurring algorithms provided herein.

The Weighted Fourier Accumulation Principle

As explained above, the motion blur does not amplify the Fourier spectrum. Let us assume first that we have access to a video sequence of 2M+1 consecutive frames centered at the reference frame v0 (M frames preceding the reference, the reference, and M frames succeeding the reference), $$v_i = (uoT_i) \star k_i + n_i + o_i, \text{ for } i=-M, \ldots, M, \quad (10)$$

where u is the latent sharp reference image, $k_i$ is the blurring kernel affecting the frame i, $n_i$ noise in the capture, $o_i$ models the parts of the frame that are different from the reference scene (e.g., occlusions), and T, models the geometric transformation between the frame i and the reference ($T_0$ is the identity function).

The rationale behind the FBA algorithm developed for still-bursts is that since blurring kernels do not amplify the Fourier spectrum, the reconstructed image should pick from each image of the burst what is less attenuated in the Fourier domain.

The principle for still images assumes that all the captured images are equal up to the effect of a shift invariant blurring kernel and additive noise, i.e., $$v_i = u \star k_i + n_i, \text{ for } i=-M, \ldots, M. \quad (11)$$

Let p be a non-negative integer, and $\{v_i\}$ be a set of aligned images of a static scene (given by Eq. (11)), then the FBA average is given by $$\bar{u} = \mathcal{F}^{-1}\left(\sum_{i=-M}^{M} w_i(\zeta) \cdot v_i(\zeta)\right), w_i(\zeta) = \frac{|\hat{v}_i(\zeta)|^p}{\sum_{j=1}^{M} |\hat{v}_j(\zeta)|^p}, \quad (12)$$

where $\hat{u}_i(\zeta)$ is the Fourier Transform of the individual image $v_i(x)$. The Fourier weight $w_i(\zeta)$ controls the contribution of the frequency $\zeta$ of image $v_i$ to the final reconstruction u. Given the Fourier frequency $\zeta$, for p>0, the larger the value of $|\hat{u}_i(\zeta)|$, the more $\hat{u}_i(\zeta)$ contributes to the average reflecting the fact that the strongest frequency values represent the least attenuated components. Note that this is not the result of assumed image models, but a direct consequence of the standard image formation model and physiology of hand tremor. Equation 12 is essentially the same as Equation 3 with the only difference being that in the case of video frames they are numbered differently (i=-M to M as opposed to i=1 to M).

The parameter p controls the behavior of the Fourier aggregation. If p=0, the restored image is just the arithmetic average of the burst, while if p→∞, each reconstructed frequency takes the maximum value of that frequency along the burst.

While this extremely simple algorithm produces very good (state-of-the-art) results in the case of static scenes, it cannot be directly applied to restore general hand-held videos. In a typical video sequence, there are moving objects, occlusions, and changes of illumination, that need to be considered. In what follows we describe how we can incorporate these dynamic components into the ideas behind the FBA algorithm to deal with real videos.

Video Deblurring Algorithm

Given a reference input blurry frame and its 2M preceding/succeeding frames, our goal is to generate a new version of the reference image having less noise and less blur. To that aim, we proceed by (i) consistently registering the adjacent 2M frames to the reference one, and then (ii) locally aggregating the registered frames with a local extension of FBA.

The goal of step (i) is to generate an equivalent input image sequence that is aligned in a way that each frame appears the same as the reference (up to a local difference in blur and noise). This enables in step (ii) the local application of the FBA procedure, without introducing artifacts. In the following, both key components are detailed.

Consistent Frame Registration

Estimating the motion from a sequence of images is a long-standing problem in computer vision. The problem known as optical flow aims at computing the motion of each pixel from consecutive frames. Most techniques tackle the problem from a variational perspective. Typically, the fitting (data) term assumes the conservation of some property (e.g., pixel brightness) along the sequence. A regularization term is then used to constraint the possible solutions, and to provide some regularity to the estimated motion field.

Registration of Temporal-Variant Blur Sequences.

In the general case where the video sequence is degraded by temporal-variant blur the problem of defining a correct frame alignment is not well defined. One algorithm for aligning a pair of blurred/non-blurred images using a prior on the kernel sparseness is described by L. Yuan, J. Sun, L. Quan, and H. Y. Shum in 2007 entitled "Blurred/non-blurred image alignment using sparseness prior," in Proc. IEEE Int. Conf. Comput. Vis. (ICCV) incorporated herein by reference. The method disclosed by L. Yuan et al. seeks the best possible alignment (from a predefined set of rigid transformations) producing the sparsest kernel compatible with the blurry/sharp image pair. The algorithm requires that one of the images is sharp (the reference) which burdens its application in general videos. Additionally, the amount of pre-defined possible rigid transformation reduces its application to videos of static scenes.

In another method an image sequence $\{v_i\}$ is said to be correctly aligned to the underlying sharp image u, if each $v_i$ satisfies $v_i = u \star k_i + n_i$, where $n_i$ models random white noise and $k_i$ is a blurring kernel having vanishing first moment. This constraint blurring kernel implies that the kernel does not drift the image u, so each $v_i$ is aligned to u. Although this definition is more general than the previous one, it does not lead to a (straightforward) construction of an optical flow estimation algorithm for blurred sequences.

Another method proposed by T. H. Kim and K. M. Lee in 2015 entitled "Generalized video deblurring for dynamic scenes," Proc. IEEE Conf. Comput. Vis. Pattern Recognit. (CVPR), incorporated herein by reference, simultaneously estimates the optical flow and the latent sharp frames by minimizing a non-convex function. The blurring operator is assumed to be locally piecewise linear, and is determined by the optical flow. Since this problem is very ill-posed the method relies on strong spatial and temporal regularizations for both the optical flows and the latent sharp images. The cost of tackling these two problems simultaneously is a much more complex optimization, and a much more sophisticated forward model binding the blurry noisy observations.

A simpler way to address the optical flow estimation when the sequence is perturbed by blur is provided below. One way of making the computation of optical flow more robust when image blur is present is by subsampling the input image sequence and computing the optical flow at a coarser scale. In this scenario, the impact of image blur is less significant. This brings up an obvious tradeoff between the optical flow resolution (and the corresponding alignment) and the level of blur to tolerate.

Handling Occlussions.

Traditional optical flow estimation techniques do not generally yield symmetrical motion fields. Estimating the flow from one image to the next (forward estimation) generally does not yield the same result as estimating the flow in the opposite direction (backward estimation). The main reason for this is that many pixels get occluded when going from one frame to the other. A direct way of taking into account occlusions is by jointly estimating forward and backwards optical flow. Some methods have exploited the fact that non-occluded pixels should have symmetric forward and backward optical flows. In some other methods, given the fact that one has access to a complete video sequence, it is advantageous to explicitly model the detection of occlusions using more than two frames in a sequence. However, for simplicity, and to reduce the computational complexity of the algorithm, only two frames are opted and the forward and backward flows are estimated independently and then cross-checked for consistency.

Consistent Pixels

Let $v_0$ be the reference image and $v_i$ one of the i = M, ..., M input frames that need to be registered to $v_0$. To apply the FBA all the frames need to be the same up to the effect of a centered shift invariant blur and noise. To satisfy these requirements, the geometric transform between each frame and the reference is first estimated, and then proceed to interpolate the set of consistent pixels (those that are in both frames and can be mapped through a geometric transform).

Let $T_i^0$ be an estimation of the optical flow from frame $v_i$ to the reference $v_0$, and similarly $T_0^i$ be the optical flow from the reference $v_0$ to vi. Let $cMap_i(x)$ represent the inconsistency between the forward and backward optical flow estimation, that is, $$cMap_i(x) := |(T_i^0 o T_0^i)(x) - x|. \quad (13)$$

We consider a pixel x to be consistently registered if $cMap_i(x) \leq \epsilon$, where $\epsilon$ is a given tolerance (in all the experiments $\epsilon = 1$).

Let $M_i$ be a mask function representing all the consistent pixels: $M_i(x) = 1$ if x is consistent, and 0 otherwise. Then, a new compatible version of $v_i$ is created by the following image blending $$v_i^0(x) = M_i(x) \cdot (v_i o T_i^0)(x) + (1 - M_i(x)) \cdot v_0(x). \quad (14)$$

This new frame $v_i^0$ propagates the reference-compatible information present in the frame $v_i$ to the frame $v_0$ and keeps the reference values in the inconsistent area. The registered set has locally the same content as the reference, up to the effect of blur and noise. Note that even in the case that the frame $v_i$ was originally blurred with a shift invariant kernel, the warped frame $v_i^0$ might now be blurred with a shift variant blur due to the blending. This imposes the need to apply the Fourier fusion locally.

We post-process the mask $M_i(x)$ to avoid artifacts when doing the blending in (14). The mask is first dilated, and then it is smoothed using a Gaussian filter to produce a smooth transition between both components. The details are given in Algorithm 2 (FIG. 20, lines 1-7).

The optical flow was computed by using an algorithm based on the minimization of an energy function containing a data fitting term using the L1 norm, and a regularization term on the total variation of the motion field. Further details of the algorithm are described by C. Zach, T. Pock, and H. Bischof in 2007 entitled "A duality based approach for realtime tv-11 optical flow," in Proc. of the $29^{th}$ DAGM Conf. on Pattern Recognit, pp. 214-223, incorporated herein by reference, and by J. Sanchez Perez, E. Meinhardt-Llops, and G. Facciolo in 2013 entitled "TV-L1 Optical Flow Estimation," J. Image Proc. On Line (IPOL), vol. 3, pp. 137-150, incorporated herein by reference. To accelerate the estimation and to mitigate the effects of blur, the optical flow is computed at ⅓ of the original resolution and then upsampled.

Figure 17:
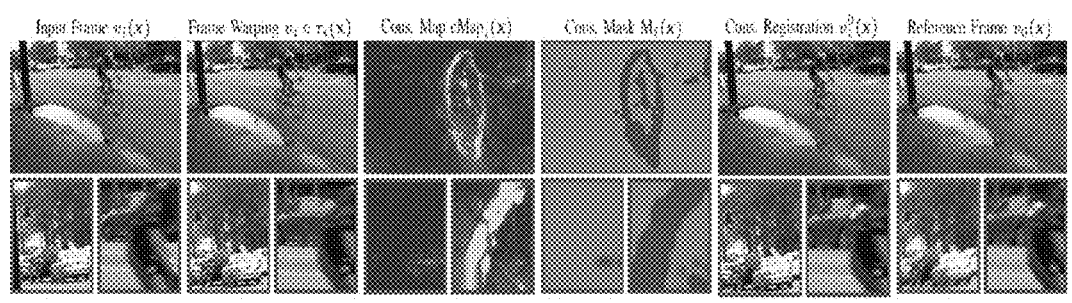
FIG. 17 shows an example of the results of registering one image to the reference frame, in the presence of moving objects and occlusions, in accordance with some embodiments.

FIG. 17 shows an example of the results of registering one image to the reference frame, in the presence of moving objects and occlusions. To avoid creating image artifacts, a conservative approach is taken and discard difficult pixels. This is done at the expense of loosing potentially valuable information for the aggregation.

Local Deblurring Through Efficient Fourier Accumulation

Due to the non-local nature of the Fourier decomposition, the Fourier aggregation in Eq. (4) requires that the input images are uniformly blurred (shift invariant kernel). The consistent registration previously described generates a set of 2M+1 frames that locally have the same content up to the effect of a local blurring kernel and noise. Thus, by splitting the frames into small blocks, the probability of satisfying the shift invariant blur assumption within each block is increased. This approximation is non critical to the final aggregation since the FBA procedure does not force an inversion (or even computes the kernels), thus avoiding the creation of artifacts when the blurring model is not fully respected.

Each registered image $v_i^0$ is split into a set of partially-overlapped blocks of b×b pixels $\{P_i^j\}$ (position indexed by super-index l=1, . . . , $n_j$), and then apply the FBA procedure separately to each set of blocks. Given the registered blocks $\{P_i^l\}$i=M–M the corresponding Fourier transforms $\{\hat{P}_i^l\}$i=M–M is directly computed. To stabilize the Fourier weights, $|\hat{P}_i^l|$ is smoothed before computing the weights, $|\overline{P}_i^l|=G_\sigma|\hat{P}_i^l|$, where $G_\sigma$ is a Gaussian filter for standard deviation $\sigma$. Then, the Fourier fusion of the set of blocks is $$P^j = \mathcal{F}^{-1}\left(\sum_{i=-M}^M w_i \cdot \hat{P}_i^l\right), w_i = \frac{|\overline{P}_i^l|^p}{\sum_{j=-M}^M |\overline{P}_i^l|^p}. \quad (15)$$

Since blocks are partially-overlapped to mitigate boundary artifacts, in the end we have more than one estimate for each image pixel (e.g., a pixel belongs to up to 4 half-overlapped blocks). The final image is created by averaging the different estimates coming from the overlapped blocks. The local Fourier fusion is detailed in Algorithm (lines 8-22) (shown in FIG. 20).

Figure 18:
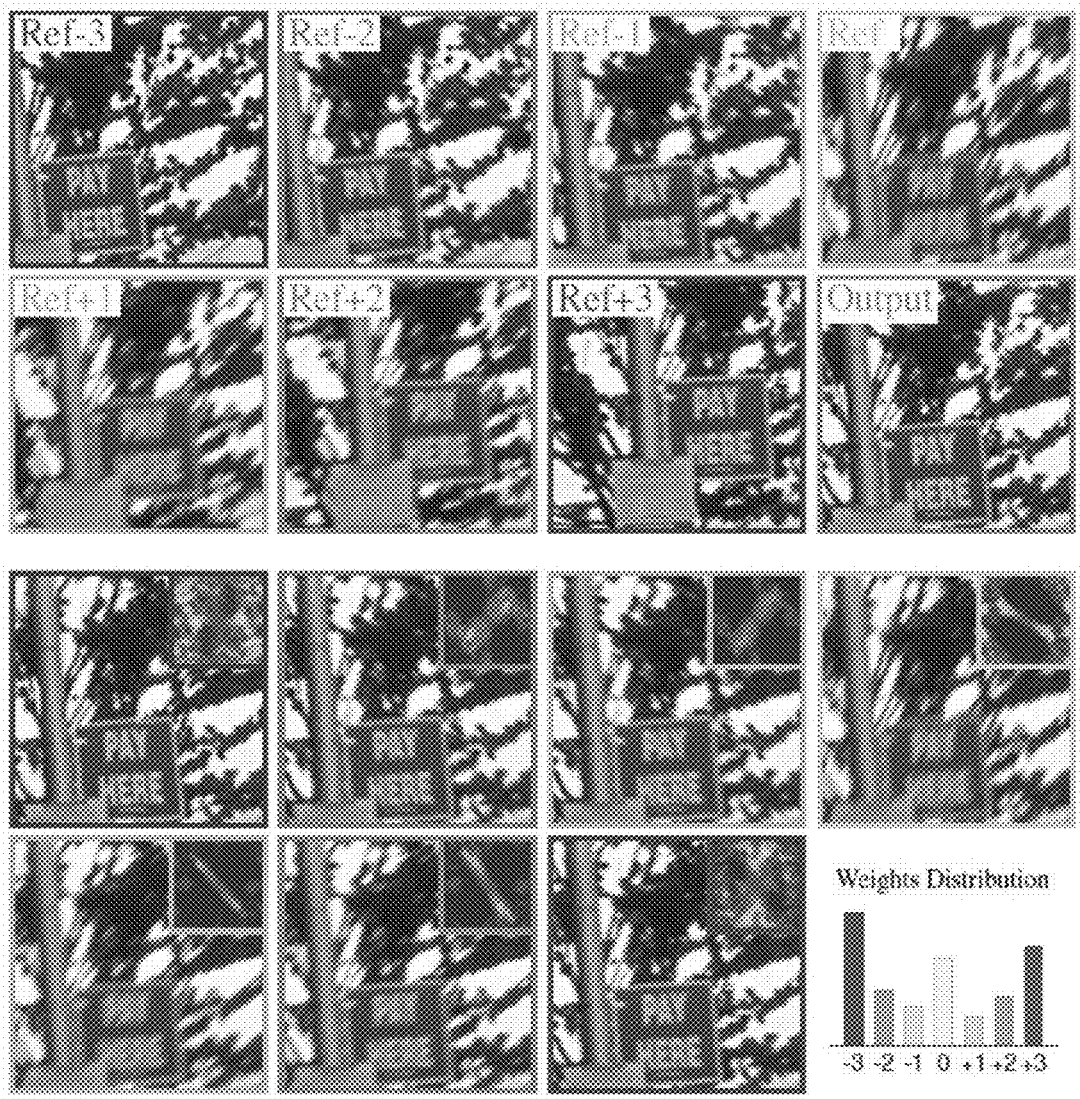
FIG. 18 shows an example of the intermediate results of the two main steps of the proposed algorithm, in accordance with some embodiments.

FIG. 18 shows an example of the intermediate results of the two main steps of the proposed algorithm. In this example, the output image results from the aggregation of different Fourier components present in different frames. The top block shows an image crop from a (non-registered) sequence of 7 frames and the output of the algorithm for the reference frame. The bottom block shows the consistent registration if the image sequence with respect to the center frame (Ref). The output image results from the aggregation of different Fourier components present in different frames. This is confirmed by the Fourier weights distribution shown in the top-right corner of each frame. The bar-plot on the bottom-right shows the frame contribution (by measuring the norm of the Fourier weights for each frame).

Iterative Improvement

Given a sequence of N images $\{v_i\}$i=1, . . . , N, the previous two steps, produce a new sequence of N images $\{\tilde{v}_i\}$. Each of these frames is created by combining the current frame and the 2M frames around it. In order to propagate the blur reduction to frames that are initially farther than M, we may proceed to apply the method iteratively.

The number of iterations needed depends on the sequence, and it is related to the type of blur, and how different the blur in nearby frames is. All the example shown in this paper were computed with 1 to 4 iterations, but in most cases applying the method only once produces significantly better results over the input sequence.

Figure 19:
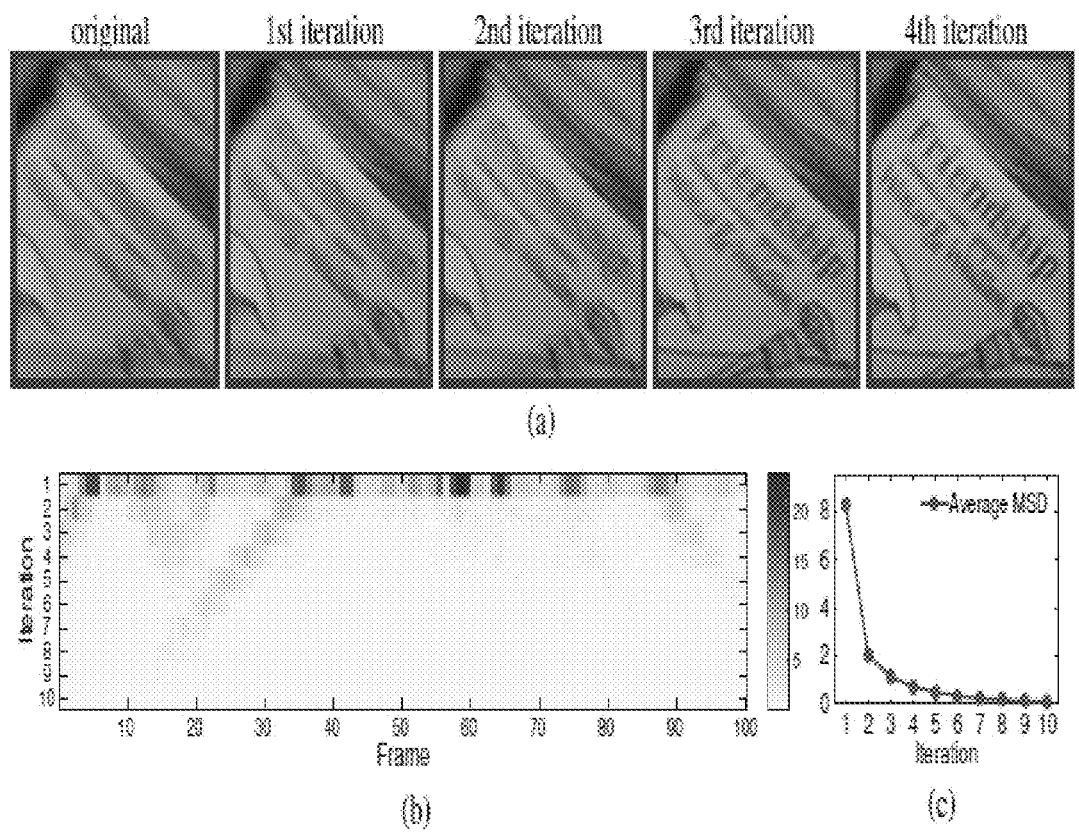
FIG. 19 shows an example of the effect of iteratively applying the deblurring algorithm, in accordance with some embodiments.

FIG. 19(a) shows an example of the effect of iteratively applying the deblurring algorithm. This will propagate the information to frames that are initially farther than the given temporal window [−M, M] frames. In this particular sequence, four iterations are required to get the best results in every frame. This is a very challenging sequence since most of the frames are significantly blurred and it has only a few very sparse sharp frames. FIG. 19(b) shows the square difference between a frame and the one from the previous iteration, a few of them change due to the update of the nearby frames. In particular the plot shows some diagonal structure representing good frames that are transferring information to their nearby ones. FIG. 19(c) shows the average change of the whole sequence when iterating (each point is the average of each shown in FIG. 19(b)). It can be seen that most of the frames do not change a lot after the first pass.

Since the algorithm averages frames, and does not actually solve any inverse problem, at the end the video sequence may have some remaining blur. In some embodiments, to enhance the final quality we may apply a simple unsharp masking step.

Complexity Analysis and Execution Time

Let $m=m_h \times m_w$ be the number of image pixels, B=b×b the block size, and 2M+1 the number of consecutive frames use in the temporal window. If we operate with half-overlapped blocks (s=b/2 in Algorithm 1) then, the more demanding part is the computation of all the Fourier Transforms, namely $O((2M+1) \cdot 2m \cdot \log B)$. This is the reason to the very low complexity of the method. In addition, one has to compute the Gaussian smoothing of the weights and the power to the p that are linear operators on the number of image pixels.

Regarding memory consumption, the algorithm does not need to access all the images simultaneously, and can proceed in an online fashion. In some embodiments, for simplicity, all the registered sequence is kept in memory to speed up the access to the image blocks. In addition, four buffers are needed: two of the size of a video frame and two of the size of the block (see Algorithm shown in FIG. 20).

The Matlab program takes about 15 seconds to filter a HD frame on a MacBook Pro 2.6 Ghz i5. This is with the default parameters: M=3 (7 frames), block size $b_h=b_w=128$, and blocks half-overlap. Two-thirds of the processing time is due to the optical flow computation and the consistent registration. Regarding the filtering part, it can be highly accelerated, since the three key components (FFT, Gaussian filtering, and power to the p) can be easily implemented in a graphical processing unit (GPU).

EXPERIMENTAL RESULTS

To evaluate and compare the proposed method seven video sequences were used that was provided by S. Cho, J. Wang, and S. Lee in 2012 entitled "Video deblurring for hand-held cameras using patch-based synthesis," ACM Trans. Graph, vol. 31, no. 4, pp. 64:1-64:9, incorporated herein by reference, as a basis, also showing additional results on a set of eight videos that were captured. These sequences show different amount of camera shake blur in varying circumstances: outdoors/indoors scenes, static scenes, moving objects, object occlusions. The full processed sequences and a video showing the results are available at the website http://dev.ipol.im/~mdelbra/videoFA/. All the results were computed using the default parameters in the Algorithm shown in FIG. 20.

Comparison to Other Video Deblurring Methods

The algorithm provided herein is compared to four other methods, both regarding image quality and execution time. The first comparison is made with the single image deconvolution algorithm by D. Krishnan, T. Tay, and R. Fergus in 2011, entitled "Blind deconvolution using a normalized sparsity measure," in Proc. IEEE Conf. Comput. Vis. Pattern Recognit. (CVPR), incorporated herein by reference. The algorithm by Krishnan et al. introduces, as a natural image prior, the ratio between the $l_1$ and the $l_2$ norms on the high frequencies of an image. This normalized sparsity measure gives low cost for the sharp image. Second comparison is made with the multi-image deconvolution algorithm by H. Zhang, D. Wipf, and Y. Zhang in 2013, entitled "Multi-image blind deblurring using a coupled adaptive sparse prior," in Proc. IEEE Conf. Comput. Vis. Pattern Recognit.

(CVPR), incorporated herein by reference. This Zhang et al. algorithm proposes a Bayesian framework for coupling all the unknown blurring kernels and the latent sharp image in a single prior. To avoid introducing image artifacts due to moving objects and occlusions (which Zhang et al. algorithm is not designed to handle), this algorithm was run on the set of consistent registered frames. Although this formulation in general produces good looking sharp images, its optimization is very slow and requires several minutes for filtering an HD frame using 7 nearby frames. For both deconvolution algorithms the code provided by the authors have been used. The algorithms rely on parameters that were manually tuned to get the best possible results. Third, comparison was made to a video deblurring method by Cho et al. The last comparison is made with the algorithm by Kim et al. This method jointly estimates the optical flow and latent sharp frames by minimizing an energy function penalizing inconsistencies to a forward model. The method is general in that it may be capable of removing blur given by the estimation of the optical flow and the camera duty cycle. The adopted energy function may have several regularization terms that forces spatial and temporal consistency.

Figure 21:
FIG. 21 and FIG. 22 show some selected crops for 6 different restored videos, in accordance with some embodiments.
Figure 22:
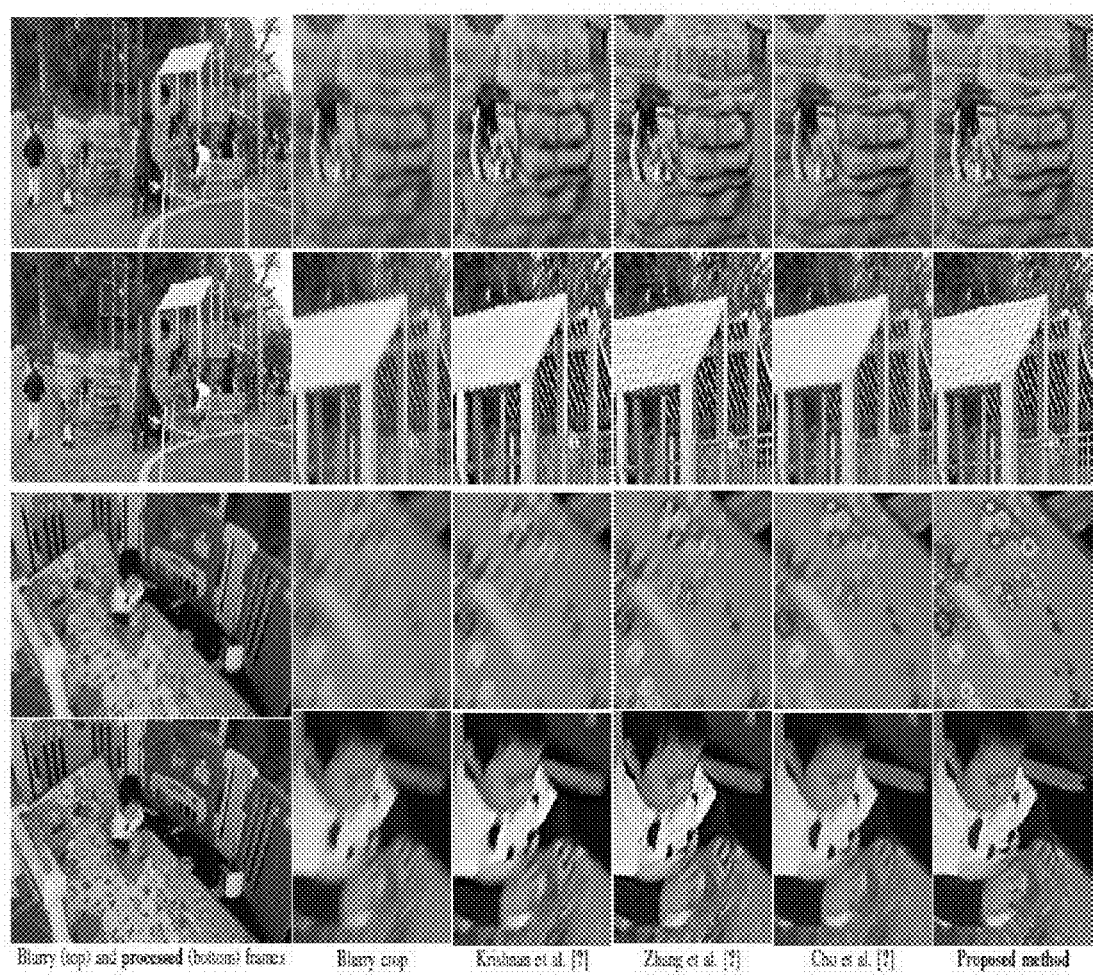

FIG. 21 and FIG. 22 show some selected crops for 6 different restored videos (provided by Cho et al). These figures show that the proposed method can successfully remove camera shake blur in realistic scenarios. In general, the proposed algorithm obtains similar or better results than those from the multi-image deconvolution algorithm by Zhang et al., at significantly reduced computational cost. Although Zhang et al. may produce sharp images, it sometimes creates artifacts. This is a result of trying to solve an inverse problem with an inaccurately estimated forward model (e.g., the blurring kernels). This is clearly observed in the "pay here" sign (FIG. 21, third row) or in the kid's carpet (FIG. 22, third row). In addition, due to the required complex optimization, this algorithm takes several minutes to filter a single frame virtually prohibiting its use for restoring full video sequences.

The single image deconvolution method provided in D. Krishnan et al. manages to get sharper images than the input ones, but their quality is significantly lower to the ones produced by our method. The main reason is that this algorithm does not use any information from the nearby— possibly sharp—frames.

The video deblurring algorithm proposed by Cho et al. manages to get good clean results. However, similar to other non-local based restoration methods, the results are often over-smooth due to the averaging of many different patches. Indeed, the extension to deal with video blur is very challenging, since the algorithm needs to find patches that are similar but differently blurred. This is observed, for example, in the books sequence (FIG. 21, first/second rows) where it is impossible to read most of the text. In addition, the proposed algorithm is much faster since it does not have to compare patches, which may be a highly computationally demanding task.

The general video deblurring algorithm proposed by Kim et al. may produce good results. Nevertheless, due to the strong imposed regularization, in many situations, the results present cartoon artifacts due to the conventional total variation image prior (to successfully remove blur total variation regularization tends to generate regions of constant color, separated by edges). This is observed, for example, in the streets and car sequences (FIG. 21) where many details have been flattened. Additionally, due to the complex non-convex minimization, this algorithm requires significant computation power taking approximately 12 minutes to process a single HD frame.

Consistent Registration and Temporal Coherence

Figure 23:
FIG. 23 and FIG. 24 show several frame crops of two of the considered video sequences for the input blurry sequences and the proposed algorithm's results, in accordance with some embodiments.
Figure 24:
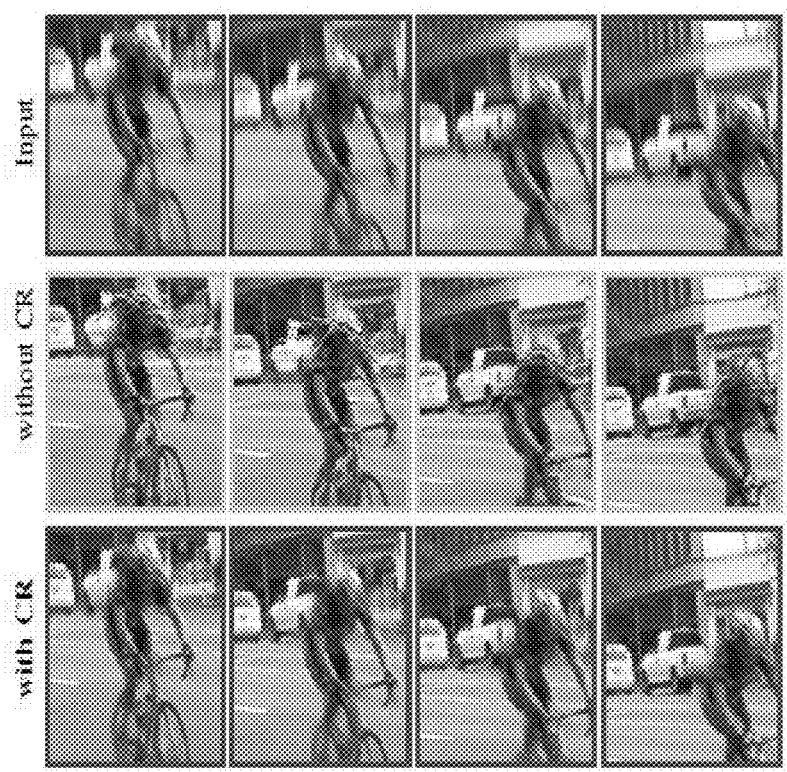

FIG. 23 and FIG. 24 show several frame crops of two of the considered video sequences, for the input blurry sequences and the proposed algorithm's results. As a general observation, the output images are much sharper than the input ones. The bike sequence shown in FIG. 24 is particularly challenging due to the biker's movement and the cars in the background. In this sequence, the importance of the consistent registration to avoid creating image artifacts can be seen. Note that while any temporal coherence was not explicitly forced, the filtered sequences are in general temporally coherent. Since the Fourier weighting scheme is done in a moving temporal window, the filtering yields results that are naturally temporally coherent. This can be checked in the videos provided in the supplementary material.

Noise Reduction

Figure 25:
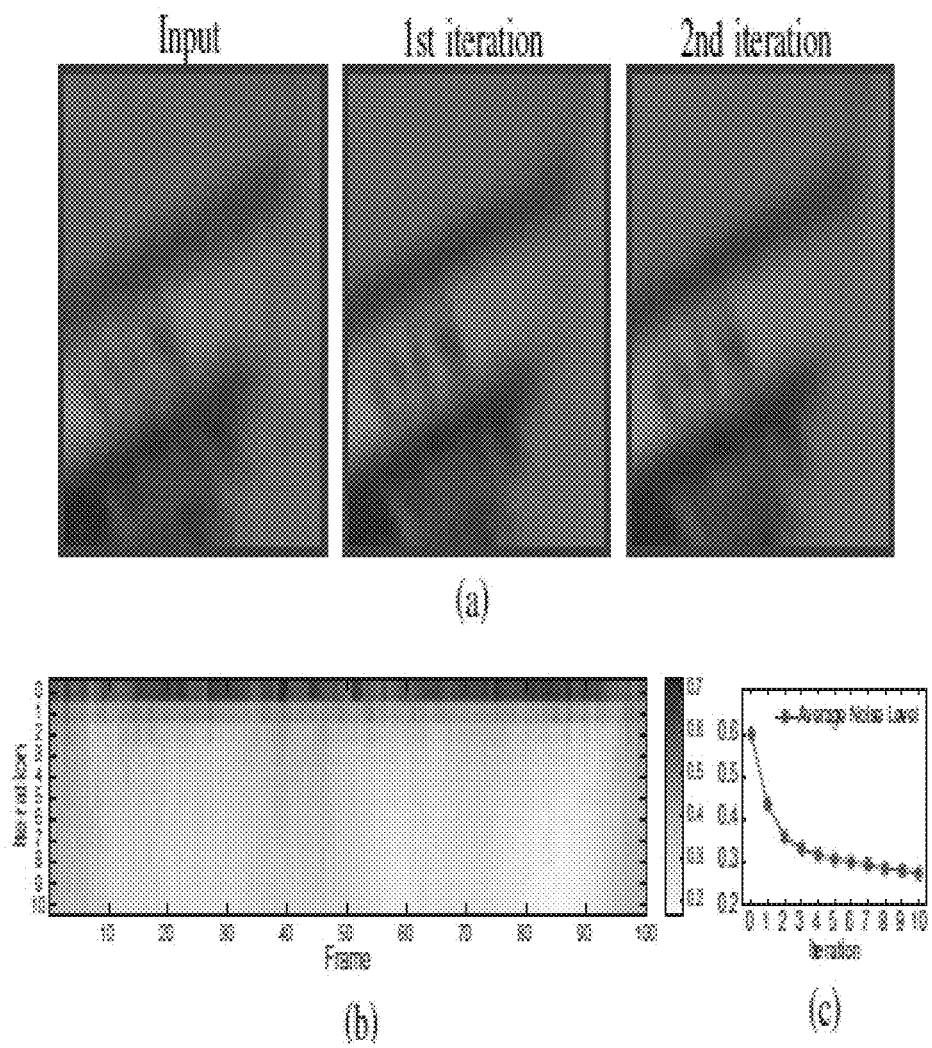
FIG. 25 shows an example of noise reduction as a byproduct effect when different frames are fusioned and different realizations of noise are averaged leading to a noise reduction.
Figure 26:
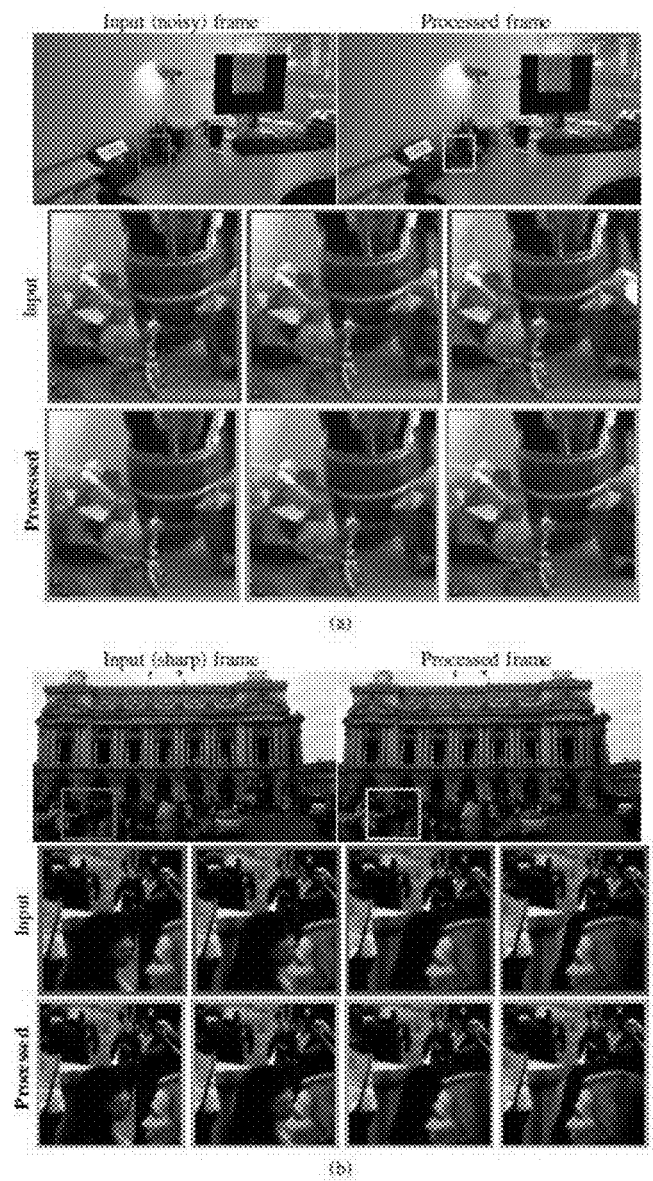
FIG. 26 shows that the algorithm averages the input frames to reduce noise when the input sequence is already sharp.

A side effect of the proposed method is the reduction of video noise. Since the algorithm averages different frames, having different noise realizations, the final sequence will have less noise. This is shown in FIG. 25 and FIG. 26, where from both a simple visual inspection and a quantitative analysis, it becomes clear that the noise is significantly reduced, in particular in the first pass of the algorithm. To that aim, the level of noise was computed in the images at each iteration, using the algorithm provided by M. Colom and A. Buades in 2013, entitled "Analysis and Extension of the Ponomarenko et al. Method, Estimating a Noise Curve from a Single Image," J. Image Proc. On Line (IPOL), vol. 3, pp. 173-197, incorporated herein by reference (see FIG. 25). When different frames are fusioned, different realizations of noise are averaged leading to a noise reduction. In the example shown in FIG. 25(a), after the first pass of the algorithm the noise is significantly reduced. In FIG. 25(b), is shown an estimation of the image noise level at different iterations for every frame in the sequence. FIG. 25(c) shows the average noise level in the whole sequence at each iteration (each point is the average of each row in FIG. 25 (b)). The first pass is the one having a larger denoising effect since it is averaging completely independent realizations.

Processing Sharp Sequences

Typical videos target dynamic scenes with many objects moving in different directions and therefore there are potentially many occlusions. FIG. 26 (b) shows an example of an already sharp sequence that was processed by the algorithm. The consistency check prevents the algorithm from averaging different parts (notably those that have been occluded and cannot be registered to nearby frames).

Dealing with Saturated Regions

Figure 27:
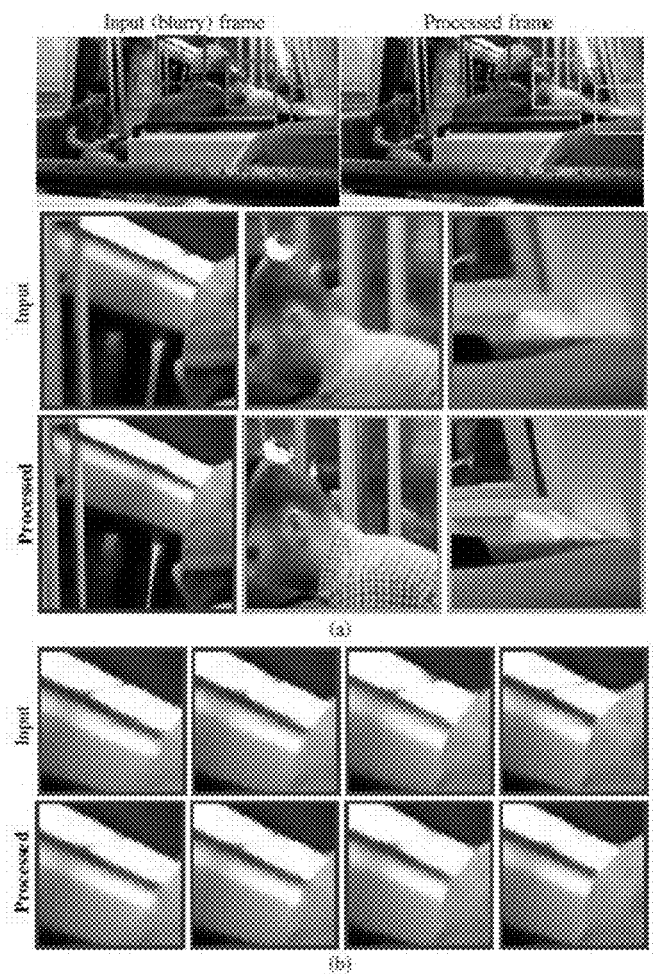
FIG. 27 shows the algorithm dealing with saturated regions that violate the linear convolution model, in accordance with some embodiments.

Videos present saturated regions in many situations. In these regions, the linear convolution model (blurring) is violated, presenting a challenge for both image registration and deblurring. FIG. 27 shows different extracts of the metro sequence that present saturated regions. In particular, saturated regions in blurry frames may change their size from one frame to another due to the difference in the respective frame blur. Thus, when registering these frames, depending on the size of the saturated region, the registration (which is based on optical flow estimation) might find a non-rigid geometric transformation that puts into perfect correspondence these two regions (as they have the same color). In this case, the algorithm will not do any blur removal since all the frames have the same content (FIG. 27 (b) left crop). On the other hand, small saturated regions (like the small light shown in FIG. 27 (b) middle crop, and the light reflection in FIG. 27 (b) right crop) are successfully deblurred since in this case the saturated region being very small, the registration algorithm rigidly transfers a sharp version found in a nearby frame. The compromise between these two behaviors is given by the optical flow estimation algorithm. In general, the algorithm successfully handles these cases. More results showing saturated regions are given in the supplementary material.

Partial Failure Cases

Figure 28:
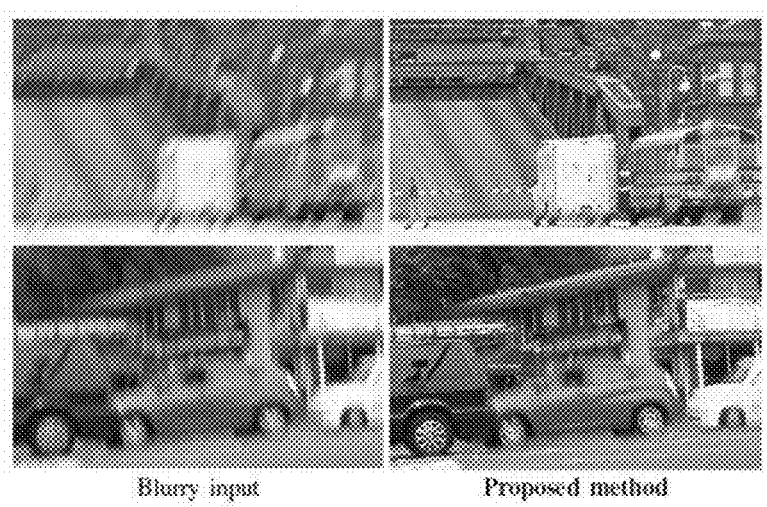
FIG. 28 shows the algorithm dealing with extreme camera shake, in accordance with some embodiments.
Figure 29:
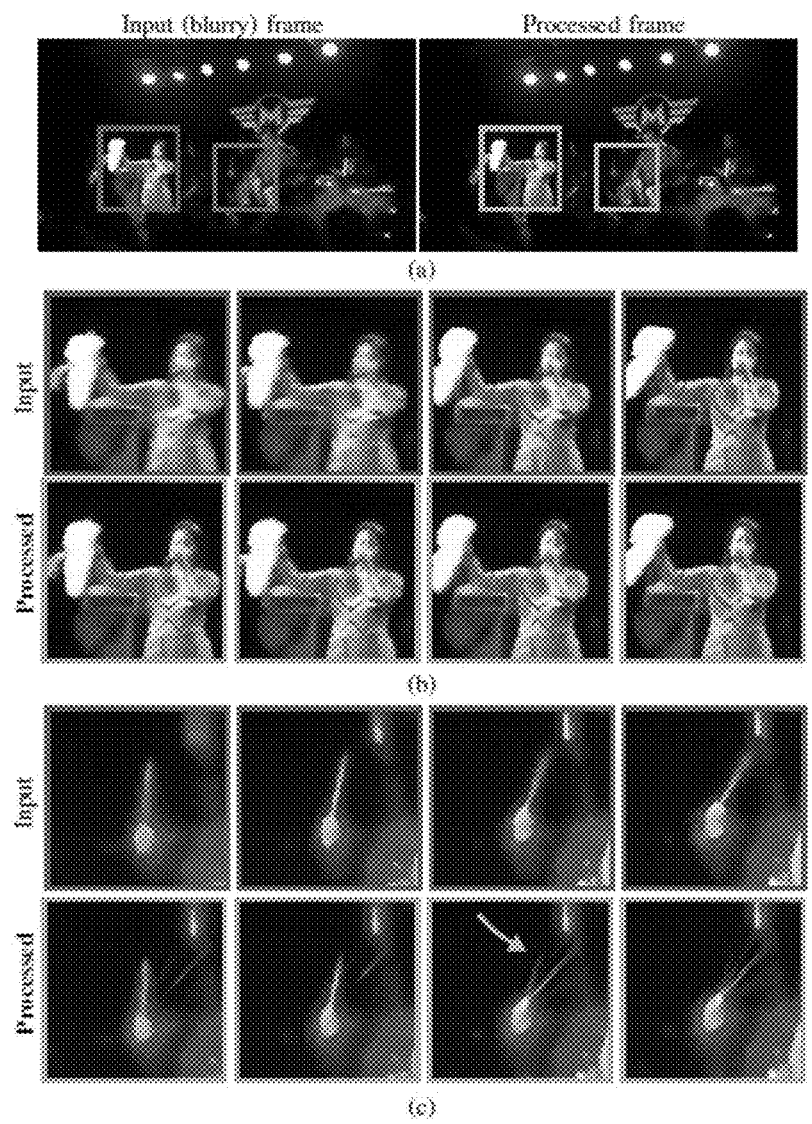
FIG. 29 shows an input blurry frame (left) and the respective frame processed by the proposed method (right), in accordance with some embodiments.

In some embodiments, when the blur is extreme, correctly registering the input frames is very challenging. In some of these difficult cases, our consistent registration may lead to image regions that are not sufficiently deblurred. This creates visual artifacts, as in the yellow bus in FIG. 28. Although the bus is mostly sharp in the restored frame, it contains some blurry parts. Also, very small and not contrasted details can be very difficult to register with the considered approach. This is due to an intrinsic ambiguity on the optical flow computation introduced by the blur. This may introduce small artifacts as shown in FIG. 29. Despite these particular local cases, the proposed algorithm produces images of very good quality.

Figure 30:
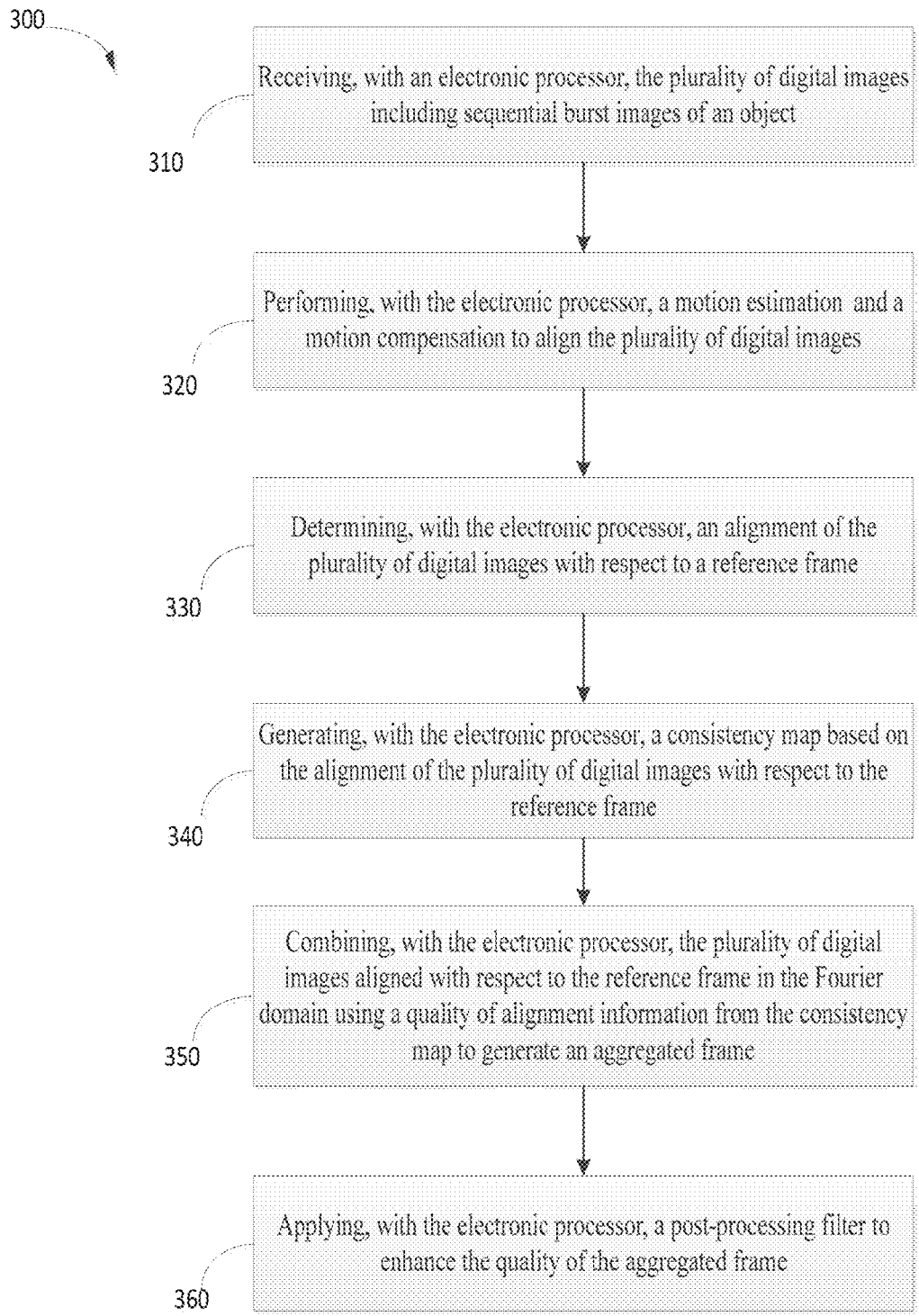
FIG. 30 shows a flow chart of a method of deblurring burst images, in accordance with some embodiments.

FIG. 30 shows a flow chart of a method 300 of automatically removing blur and noise in a plurality of digital images, in accordance with some embodiments. At block 310, the method 300 includes receiving, with the electronic processor 12, a plurality of digital images including sequential burst images of an object. In some embodiments, the plurality of digital images in block 310 is received from a video sequence captured in a digital camera. In some embodiments, the plurality of digital images in block 310 includes an image burst sequence captured from a burst mode of a digital camera.

At block 320, the method 300 includes performing, with the electronic processor 12, motion estimation and a motion compensation to align the plurality of digital images. In some embodiments, performing the motion estimation includes computing a global homography between each frame and a reference frame. In some embodiments, performing the motion estimation includes computing a local homography between each frame and the reference frame. in some embodiments, performing the motion estimation includes computing at least one of a homography and an affine transform between each frame and the reference frame. In some other embodiments, performing the motion estimation includes computing at least one a a homography and an affine transform between a block of a frame and a block of the reference frame. In some embodiments, the motion estimation is performed by computing optical flow vectors.

At block 330, the method 300 includes determining, with the electronic processor 12, an alignment of the plurality of digital images with respect to a reference frame. At block 340, the method 300 includes generating, with the electronic processor 12, a consistency map based on the alignment of the plurality of digital images with respect to the reference frame. In some embodiments, the consistency map is generated by measuring the difference in color between a. block of pixels in one of the aligned frames and the reference frame. In some embodiments, the consistency map is generated by measuring the difference between forward and backward optical flow.

At block 350, the method 300 includes combining, with the electronic processor 12, the plurality of digital images aligned with respect to the reference frame in the Fourier domain using a quality of alignment information from the consistency map to generate an aggregated frame. In some embodiments, the aggregated frame is generated by computing a new set of aligned images with respect to the reference where each frame is transported using the motion compensation and the consistency map. At block 360, the method 300 includes applying, with the electronic processor 12, a post-processing filter to enhance the quality of the aggregated frame. The post-processing filter used in block 360 may be implemented in hardware or software. In some embodiments, method 300 further comprises computing Fourier transforms of the new set of aligned images, computing a weighted average in the Fourier domain of the Fourier transforms of the new set of aligned images, and computing inverse Fourier transform of the computed weighted average.

In some embodiments of method 300, the weighted average in the Fourier domain is computed locally according to the expression:

$$P^i = \mathcal{F}^{-1}\left(\sum_{i=-M}^{M} w_i \cdot \hat{P}_i^l\right),$$

where the weights $w_i$ is large if the magnitude of the Fourier transform of a block of pixels $P_i$ is relatively large with respect to the others $P_j$ with j different than i. In some embodiments of method 300, the weights $w_i$ are computed according, according to $$w_i = \frac{|\overline{\hat{P}}_i^l|^p}{\sum_{j=-M}^{M} |\overline{\hat{P}}_j^l|^p}$$

where p is a parameter that can vary between 0 and infinite and $$|\overline{\hat{P}}_i^l| = G_\sigma |\hat{P}_i^l|,$$

is a Gaussian smoothed version of the Fourier transform magnitude of a block $P_i$.

Any patents or publications mentioned in this specification are indicative of the levels of those skilled in the art to which the invention pertains. These patents and publications are herein incorporated by reference to the same extent as if each individual publication was specifically and individually indicated to be incorporated by reference. In case of conflict, the present specification, including definitions, will control.

The present disclosure described herein and representative embodiments, are exemplary, and are not intended as limitations on the scope of the invention. Changes therein and other uses will occur to those skilled in the art which are encompassed within the spirit of the invention as defined by the scope of the claims.

Various features and advantages of embodiments of the invention are set forth in the following claims.

What is claimed is:

1. A method for automatically removing blur and noise in a plurality of digital images comprising:
   receiving, with an electronic processor, the plurality of digital images including sequential burst images of an object;
   performing, with the electronic processor, a motion estimation and a motion compensation to align the plurality of digital images;

determining, with the electronic processor, an alignment of the plurality of digital images with respect to a reference frame;

generating, with the electronic processor, a consistency map based on the alignment of the plurality of digital images with respect to the reference frame;

combining, with the electronic processor, the plurality of digital images aligned with respect to the reference frame in the Fourier domain using a quality of alignment information from the consistency map to generate an aggregated frame; and applying, with the electronic processor, a post-processing filter to enhance the quality of the aggregated frame.

2. The method of claim 1, wherein the plurality of digital images is received from a video sequence captured in a digital camera.

3. The method of claim 1, wherein the plurality of digital images includes an image burst sequence captured from a burst mode of a digital camera.

4. The method of claim 1, wherein performing, with the electronic processor, the motion estimation includes computing a global homography between each frame and the reference frame.

5. The method of claim 1, wherein performing, with the electronic processor, the motion estimation includes computing at least one of a homography or an affine transform between each frame and the reference frame.

6. The method of claim 1, wherein performing, with the electronic processor, the motion estimation includes computing at least one of a homography and an affine transform between a block of a frame and a block of the reference frame.

7. The method of claim 1, wherein performing with the electronic processor, the motion estimation includes computing optical flow vectors.

8. The method of claim 1, wherein the consistency map is generated by measuring the difference in color between a block of pixels in one of the aligned frames and the reference frame.

9. The method of claim 1, wherein the consistency map is generated by measuring the difference between forward and backward optical flow.

10. The method of claim 1, wherein the aggregated frame is generated by computing a new set of aligned images with respect to the reference where each frame is transported using the motion compensation and the consistency map.

11. The method of claim 10, further comprising:
computing Fourier transforms of the new set of aligned images,
computing a weighted average in the Fourier domain of the Fourier transforms of the new set of aligned images, and
computing inverse Fourier transform of the computed weighted average.

12. The method of claim 11, wherein the weighted average in the Fourier domain is computed locally according to the expression:

$$P^l = \mathcal{F}^{-1}\left(\sum_{i=-M}^{M} w_i \cdot \hat{P}_i^l\right),$$

where the weights $w_i$ is large if the magnitude of the Fourier transform of a block of pixels $P_i$ is relatively large with respect to the others $P_j$ with j different than i.

13. The method of claim 12, where the weights are computed according, according to $$w_i = \frac{|\bar{P}_i^l|^p}{\sum_{j=-M}^{M} |\bar{P}_j^l|^p}$$

where p is a parameter that can vary between 0 and infinite and $$|\bar{P}_i^l| = G_\sigma |\hat{P}_i^l|,$$

is a Gaussian smoothed version of the Fourier transform magnitude of a block $P_i$.

14. The method of claim 1, wherein applying the post-processing filter on the aggregated frame includes performing an unsharp masking.

15. An image processing system comprising:
an electronic processor configured to
receive a plurality of digital images including sequential burst images of an object;
perform motion estimation and a motion compensation to align the plurality of digital images;
determine an alignment of the plurality of digital images with respect to a reference frame;
generate a consistency map based on the alignment of the plurality of digital images with respect to the reference frame;
combine the plurality of digital images aligned with respect to the reference frame in the Fourier domain using a quality of alignment information from the consistency map to generate an aggregated frame; and
apply a post-processing filter to enhance the quality of the aggregated frame thereby removing blur and noise in the plurality of digital images.

16. The image processing system of claim 15, wherein the aggregated frame is generated by computing a new set of aligned images with respect to the reference where each frame is transported using the motion compensation and the consistency map.

17. The image processing system of claim 16, wherein the electronic processor is further configured to
compute Fourier transforms of the new set of aligned images,
compute a weighted average in the Fourier domain of the Fourier transforms of the new set of aligned images, and
compute inverse Fourier transform of the computed weighted average.

18. The image processing system of claim 17, wherein the weighted average in the Fourier domain is computed locally according to the expression:

$$P^l = \mathcal{F}^{-1}\left(\sum_{i=-M}^{M} w_i \cdot \hat{P}_i^l\right),$$

where the weights $w_i$ is large if the magnitude of the Fourier transform of a block of pixels $P_i$ is relatively large with respect to the others $P_j$ with j different than i.

19. The image processing system of claim 18, where the weights are computed according, according to the expression:

$$w_i = \frac{|\overline{\hat{P}}_i^l|^p}{\sum_{j=-M}^{M} |\overline{\hat{P}}_j^l|^p}$$

where p is a parameter that can vary between 0 and infinite and $$|\overline{\hat{P}}_i^l| = G_\sigma |\hat{P}_i^l|,$$

is a Gaussian smoothed version of the Fourier transform magnitude of a block $P_i$.

* * * * *